(12) United States Patent  
Li

(10) Patent No.: US 12,446,044 B2  
(45) Date of Patent: Oct. 14, 2025

(54) DATA TRANSMISSION METHOD AND CORRESPONDING TERMINAL

(71) Applicant: Huawei Technologies Co., Ltd., Shenzhen (CN)

(72) Inventor: Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 506 days.

(21) Appl. No.: 17/371,835

(22) Filed: Jul. 9, 2021

(65) Prior Publication Data

US 2021/0337583 A1   Oct. 28, 2021

Related U.S. Application Data

(63) Continuation of application No. PCT/CN2020/070514, filed on Jan. 6, 2020.

(30) Foreign Application Priority Data

Jan. 11, 2019   (CN) .......................... 201910028452.3

(51) Int. Cl.  
*H04W 72/12* (2023.01)  
*H04W 8/24* (2009.01)  
(Continued)

(52) U.S. Cl.  
CPC ............. *H04W 72/23* (2023.01); *H04W 8/24* (2013.01); *H04W 72/0446* (2013.01);  
(Continued)

(58) Field of Classification Search  
CPC ... H04W 72/23; H04W 8/24; H04W 72/0446; H04W 72/0453; H04W 72/1263  
(Continued)

(56) References Cited

U.S. PATENT DOCUMENTS

2018/0014339 A1    1/2018  Baek et al.  
2018/0352556 A1   12/2018  Loehr et al.  
(Continued)

FOREIGN PATENT DOCUMENTS

CN    109152076 A    1/2019  
CN    109155725 A    1/2019  
(Continued)

OTHER PUBLICATIONS

Samsung, "Discussion on Uu-based sidelink resource allocation and configuration", 3GPP TSG RAN WG1 #95, R1-1812989, Spokane, WA, US, Nov. 12-16, 2018, 6 pages.  
(Continued)

*Primary Examiner* — Faisal Choudhury  
(74) *Attorney, Agent, or Firm* — Slater Matsil, LLP

(57) ABSTRACT

This application discloses a data transmission method and a corresponding terminal, and relates to the field of the Internet of Vehicles or intelligent connected vehicle communications technologies. In this application, a first terminal processes data sending or receiving on a sidelink based on processing capabilities of the first terminal for scheduling different types of sidelinks by different types of network devices, and may determine, based on an actual processing capability and scheduling requirements of the different types of network devices on transmission of different types of sidelink data of a terminal, whether to accept the scheduling.

13 Claims, 8 Drawing Sheets

(51) Int. Cl.
　　*H04W 72/0446*　　(2023.01)
　　*H04W 72/0453*　　(2023.01)
　　*H04W 72/1263*　　(2023.01)
　　*H04W 72/23*　　　(2023.01)
　　*H04W 92/18*　　　(2009.01)

(52) U.S. Cl.
　　CPC ... *H04W 72/0453* (2013.01); *H04W 72/1263* (2013.01); *H04W 92/18* (2013.01)

(58) Field of Classification Search
　　USPC .................................................. 370/329
　　See application file for complete search history.

(56) References Cited

U.S. PATENT DOCUMENTS

| | | | | |
|---|---|---|---|---|
| 2020/0053524 | A1* | 2/2020 | Novlan | H04W 84/20 |
| 2020/0107236 | A1* | 4/2020 | Tseng | H04W 72/044 |
| 2020/0205127 | A1* | 6/2020 | Tang | H04W 72/20 |
| 2021/0250118 | A1* | 8/2021 | Roth-Mandutz | H04W 72/56 |
| 2021/0321376 | A1* | 10/2021 | Lu | H04L 5/0094 |
| 2021/0352599 | A1* | 11/2021 | Kusashima | H04W 56/002 |
| 2022/0070879 | A1* | 3/2022 | Ryu | H04W 72/56 |
| 2022/0095186 | A1* | 3/2022 | Zhang | H04W 36/14 |

FOREIGN PATENT DOCUMENTS

| | | | | |
|---|---|---|---|---|
| EP | 3861812 | A1 | 8/2021 | |
| JP | 2017516361 | A | 6/2017 | |
| WO | 2018120158 | A1 | 7/2018 | |
| WO | 2018149265 | A1 | 8/2018 | |
| WO | 2018168169 | A1 | 9/2018 | |
| WO | WO-2018174779 | A1 * | 9/2018 | ............ H04W 24/10 |
| WO | 2020069668 | A1 | 4/2020 | |

OTHER PUBLICATIONS

CATT, "On LTE Uu and NR Uu control NR sidelink in NR V2X", 3GPP TSG RAN1 Meeting #94, R1-1808404, Gothenburg, Sweden, Aug. 20-24, 2018, 4 pages.
Huawei et al., "Summary of AI: 7.2.4.3 Uu-based sidelink resource allocation/configuration", 3GPP TSG RAN WG1 Meeting #94bis, R1-1811946, Chengdu, China, Oct. 8-12, 2018, 8 pages.
3rd Generation Partnership Project; Technical Specification Group Radio Access Network; NR; Multiplexing and channel coding (Release 15), 3GPP TS 38.212 V15.3.0 (Sep. 2018), 99 pages.
Huawei et al., "The enhancement of Uu to control inter-RAT V2X sidelink", 3GPP TSG-RAN WG2 Meeting #103bis, R2-1815200, Chengdu, China, Oct. 8-12, 2018, 4 pages.
Vodafone, "New SID: Study on NR V2X", 3GPP TSG RAN Meeting #80, RP-181429, La Jolla, CA, USA, Jun. 11-14, 2018, 5 pages.
3rd Generation Partnership Project; Technical Specification Group Radio Access Network;NR; Physical layer procedures for control (Release 15), 3GPP TS 38.213 V15.3.0 (Sep. 2018), 101 pages.
Samsung, "Solution for KI#2 / KI#12: PC5 resource control", SA WG2 Meeting #128, S2-186933, Vilnius, Lithuania, Jul. 2-6, 2018, 3 pages.
3rd Generation Partnership Project; Technical Specification Group Radio Access Network; NR; Physical layer procedures for data (Release 15), 3GPP TS 38.214 V15.3.0 (Sep. 2018), 96 pages.
3rd Generation Partnership Project; Technical Specification Group Radio Access Network; NR; Radio Resource Control (RRC) protocol specification (Release 15), 3GPP TS 38.331 V15.3.0 (Sep. 2018), 445 pages.
3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.3.0 (Sep. 2018), 918 pages.
3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.3.0 (Sep. 2018), 127 pages.
3rd Generation Partnership Project; Technical Specification Group Radio Access Network; NR; User Equipment (UE) radio access capabilities (Release 15), 3GPP TS 38.306 V15.3.0 (Sep. 2018), 31 pages.
Huawei et al., "Discussion on NR Uu to control LTE PC5", 3GPP TSG RAN WG1 Meeting #95, R1-1813549, Spokane, WA, US, Nov. 12-16, 2018, 4 pages.
VIVO, "Enhancements of Uu link to control sidelink", 3GPP TSG RAN WG1 Meeting #95, R1-1812310, Spokane, WA, US, Nov. 12-16, 2018, 5 pages.
3rd Generation Partnership Project; Technical Specification Group Radio Access Network; NG-RAN; F1 application protocol (F1AP) (Release 15), 3GPP TS 38.473 V15.3.0 (Sep. 2018), 176 pages.
OPPO, "On NR Uu to control LTE sidelink", 3GPP TSG-RAN WG1 Meeting #94bis, R1-1810978, Chengdu, China, Oct. 8-12, 2018, 3 pages.
ZTE et al., "Discussion on Uu based resource allocation/ configuration for NR V2X", 3GPP TSG RAN WG1 Meeting #95, R1-1813179, Spokane, WA, US, Nov. 12-16, 2018, 5 pages.
Huawei et al., "Discussion on LTE Uu to control NR sidelink," 3GPP TSG RAN WG1 Meeting #95, R1-1813668, Nov. 12-16, 2018, 4 pages.
R1-1813668, Huawei et al, Discussion on LTE Uu to control NR sidelink, 3GPP TSG RAN WG1 Meeting #95, Spokane, USA, Nov. 12-16, 2018, 4 pages.

\* cited by examiner

DATA TRANSMISSION METHOD AND CORRESPONDING TERMINAL

CROSS-REFERENCE TO RELATED APPLICATIONS

This application is a continuation of International Application No. PCT/CN2020/070514, filed on Jan. 6, 2020, which claims priority to Chinese Patent Application No. 201910028452.3, filed on Jan. 11, 2019. The disclosures of the aforementioned applications are hereby incorporated by reference in their entireties.

TECHNICAL FIELD

Embodiments of this application relate to the field of communications technologies, and in particular, to a data transmission method and a corresponding terminal.

BACKGROUND

Currently, intelligent transportation represented by self-driving has increasingly become a key technology to be researched and developed in this field. To better support intelligent transportation, the 3GPP has started research on a next-generation Internet of Vehicles technology in a 5G framework. However, before 5G vehicle-to-everything (V2X) technology research, LTE-V2X-based technical standards and products are available on the market.

Frequent updates and upgrades of LTE-V2X vehicle-mounted communications modules are costly and inconvenient. On the other hand, when the 5G era arrives, in 5G, a dual-connectivity EN-DC network architecture of LTE and 5G-NR is initially supported, and a standalone (SA) network architecture can be supported subsequently. In NR-V2X, it is required that an LTE base station can be used to control an NR-V2X module of a terminal without affecting use of the LTE base station to control an LTE-V2X module of the terminal, so that requirements for 5G standalone can be reduced at an initial stage of 5G operation. In addition, it is also required that a 5G base station can be used to control the LTE-V2X module of the terminal without affecting use of the 5G base station to control the NR-V2X module of the terminal, so that after network exit of LTE, use of an LTE-V2X vehicle-mounted module is not affected, that is, cross-link scheduling between 4G and 5G needs to be implemented.

In the conventional technology, a base station may schedule, on a carrier CC 1 of a cellular link, a terminal on another carrier CC 2 of the cellular link to perform sending and receiving. However, in this process, the base station still schedules receiving and sending of a terminal that is on the cellular link and that supports a same network standard as the base station. In addition, cross-carrier scheduling is not substantially different from single-carrier scheduling. Consequently, scheduling, of receiving and sending of a terminal, by network devices using different transmission technologies still cannot be implemented based on the conventional technology.

SUMMARY

Embodiments of this application provide a data transmission method and a corresponding terminal, so that different types of network devices can schedule and control transmission of different types of sidelink data of a terminal.

To achieve the foregoing objective, the following technical solutions are used in the embodiments of this application.

According to a first aspect, a data transmission method is provided. The method may include: A first terminal receives sidelink transmission configuration information from a first network device through a cellular link, where the sidelink transmission configuration information is used to indicate that an NR sidelink is scheduled through an LTE cellular link, or an LTE sidelink is scheduled through an NR cellular link, or an NR sidelink is scheduled through an NR cellular link. The first terminal sends or receives data on a sidelink based on the sidelink transmission configuration information and a processing capability of the first terminal.

According to the technical solution provided in the first aspect, the first terminal processes data sending or receiving on the sidelink based on processing capabilities of the first terminal for scheduling different types of sidelinks by different types of network devices, and can implement cross-link data transmission from LTE to NR or from NR to LTE and data transmission from NR to NR based on an actual processing capability and scheduling requirements of the different types of network devices on transmission of different types of sidelink data of a terminal.

In a possible implementation, the sidelink transmission configuration information may be any one of the following information: downlink control information DCI, a radio resource control RRC message, or a system information block SIB message. Different scheduling modes need to be used based on a specific network device type and scheduling of transmission of different types of sidelink data of the terminal, so that a scheduling process can be more flexibly implemented.

In a possible implementation, the first terminal may report indication information of the processing capability of the first terminal to the first network device. The indication information of the processing capability of the first terminal is reported to the first network device, so that the first network device determines, based on processing capabilities of the first terminal for different types of sidelink scheduling information of different types of network devices, whether to perform current sidelink scheduling, and determines a specific time at which the first terminal needs to perform sidelink data transmission.

In a possible implementation, the processing capability of the first terminal may include at least one of the following: the first terminal supports the first network device in indicating, through the LTE cellular link, the first terminal to perform data transmission on the NR sidelink; the first terminal supports the first network device in indicating, through the NR cellular link, the first terminal to perform data transmission on the LTE sidelink; or the first terminal supports the first network device in indicating, through the NR cellular link, the first terminal to perform data transmission on the NR sidelink. The first terminal may determine, depending on whether the first terminal can support to be indicated through different types of cellular links to perform transmission of different types of sidelink data, whether to receive the scheduling, or the first network device may determine, based on the processing capability reported by the first terminal, whether to perform current sidelink scheduling.

In a possible implementation, the processing capability of the first terminal may include at least one of the following: a processing delay parameter for sending or receiving data by the first terminal in first mode on the NR sidelink based on a DCI indication that is received from the first network device through the LTE cellular link; a processing delay parameter for sending or receiving data by the first terminal in second mode on the NR sidelink based on an RRC or SIB indication that is received from the first network device through the LTE cellular link; a processing delay parameter for sending or receiving data by the first terminal in third mode on the LTE sidelink based on a DCI indication that is received from the first network device through the NR cellular link; a processing delay parameter for sending or receiving data by the first terminal in fourth mode on the LTE sidelink based on an RRC or SIB indication that is received from the first network device through the NR cellular link; a processing delay parameter for sending or receiving data by the first terminal in first mode on the NR sidelink based on a DCI indication that is received from the first network device through the NR cellular link; or a processing delay parameter for sending or receiving data by the first terminal in second mode on the NR sidelink based on an RRC or SIB indication that is received from the first network device through the NR cellular link. The first terminal may determine, depending on whether the first terminal can support starting of data transmission on the sidelink at a specified time, whether to receive the scheduling; or the first network device may determine, based on the processing capability reported by the first terminal, whether to perform current sidelink scheduling or determine a specific time at which the first terminal needs to perform sidelink data transmission.

In a possible implementation, the processing delay parameter for sending or receiving the data in first mode on the NR sidelink, the processing delay parameter for sending or receiving the data in second mode on the NR sidelink, the processing delay parameter for sending or receiving the data in third mode on the LTE sidelink, the processing delay parameter for sending or receiving the data in fourth mode on the LTE sidelink, the processing delay parameter for sending or receiving the data in first mode on the NR sidelink, or the processing delay parameter for sending or receiving the data in second mode on the NR sidelink includes processing delay parameter value indication information or processing delay parameter type indication information; and the processing delay parameter type indication information is used to indicate a processing delay parameter type or a processing delay parameter value corresponding to the processing capability of the first terminal. The first terminal may determine, depending on whether the first terminal can support starting of data transmission on the sidelink at a specified time, whether to receive the scheduling; or the first network device may determine, based on the processing capability reported by the first terminal, whether to perform current sidelink scheduling or determine a specific time at which the first terminal needs to perform sidelink data transmission.

In a possible implementation, the processing capability of the first terminal may be determined by using at least one of the following: a subcarrier spacing of the sidelink; a quantity of retransmissions on the sidelink; a quantity of slots occupied by one transmission on the sidelink; a transmission mode of the sidelink; a demodulation reference signal position of the sidelink; an operating frequency band of the sidelink; a type of an operating carrier of the sidelink; or a mapping mode of a sidelink transmission resource. Capabilities of the first terminal for processing different types of sidelink scheduling information of different types of network devices may be determined based on the foregoing time domain configuration, the foregoing frequency domain configuration, and another related setting.

In a possible implementation, the sidelink transmission configuration information may further include but is not limited to: a mode of scheduling a sidelink through a cellular link, where the mode of scheduling a sidelink through a cellular link may be indicated by using at least one of an RRC or SIB message, a DCI format, signaling in DCI, or an RNTI corresponding to the DCI; and the mode of scheduling a sidelink through a cellular link includes at least one of the following: indicating, through an LTE cellular link, the first terminal to send or receive data on an LTE sidelink; indicating, through an LTE cellular link, the first terminal to send or receive data on an NR sidelink; indicating, through an NR cellular link, the first terminal to send or receive data on an NR sidelink; or indicating, through an NR cellular link, the first terminal to send or receive data on an LTE sidelink. The cellular link may be used to indicate, by using at least one of the RRC or SIB message, the DCI format, the signaling in the DCI, or the RNTI corresponding to the DCI, to establish the sidelink.

In a possible implementation, the sidelink transmission configuration information may further include: an indication time T for sending or receiving data on the sidelink by the first terminal. Before the first terminal sends or receives the data on the sidelink based on the sidelink transmission configuration information and the processing capability of the first terminal, the method may further include: determining, based on the processing delay parameter and T, whether to perform data sending or receiving on the sidelink. The first terminal may determine, depending on whether the first terminal can start transmission of different types of sidelink data at a specified time, whether to receive the scheduling.

In a possible implementation, the sidelink transmission configuration information is RRC or a SIB, and that the first terminal sends or receives the data on the sidelink based on the sidelink transmission configuration information and the processing capability of the first terminal includes: The first terminal determines a si delink transmission resource based on the sidelink transmission configuration information; and sends or receives the data on the sidelink by using the sidelink transmission resource. The first terminal can complete sending and receiving of different types of sidelink data by using the determined sidelink transmission resource.

In a possible implementation, the sidelink transmission configuration information may further include time domain resource configuration information and frequency domain resource configuration information; the time domain resource configuration information is used to indicate a time domain resource used for sending or receiving on the sidelink; and the frequency domain resource configuration information is used to indicate a frequency domain resource used for sending or receiving on the sidelink. The sending or receiving data on a sidelink includes: The first terminal sends or receives the data on the sidelink based on the time domain resource configuration information and the frequency domain resource configuration information. The first terminal can complete sending and receiving of different types of sidelink data by using the determined time domain resource and frequency domain resource.

In a possible implementation, the sidelink transmission configuration information may further include semi-persistent scheduling SPS configuration index information and SPS indication information; the SPS configuration index information may include configured SPS information; and the SPS indication information may include SPS information required for sending or receiving on the sidelink. Before the first terminal sends or receives the data on the sidelink, the method may further include: The first terminal completes SPS activation and deactivation based on the SPS configuration index information and the SPS indication information. The first terminal can complete sending and receiving of different types of sidelink data by using determined SPS.

According to a second aspect, a data transmission method is provided. The method may include: A second terminal receives sidelink control information from a first terminal through a sidelink, where the sidelink control information is used to indicate the second terminal to receive sidelink data. The second terminal receives the sidelink data on the sidelink based on a processing capability of the second terminal.

According to the technical solution provided in the second aspect, the second terminal processes data receiving on the sidelink based on the processing capability of the second terminal, and may determine, based on an actual processing capability and requirements of the first terminal on receiving or feedback of different types of sidelink data, whether to accept the scheduling.

In a possible implementation, the second terminal reports indication information of the processing capability of the second terminal to a first network device; or the second terminal sends indication information of the processing capability of the second terminal to the first terminal. The indication information of the processing capability of the second terminal is sent to the first network device or the first terminal, so that the first network device determines, based on processing capabilities of the second terminal for different types of sidelink data, whether to perform current sidelink scheduling, or the first terminal determines, based on processing capabilities of the second terminal for different types of sidelink data, whether to perform current sidelink data sending.

In a possible implementation, the processing capability of the second terminal is determined by using at least one of the following: a subcarrier spacing of the sidelink; a quantity of retransmissions on the sidelink; a quantity of slots occupied by one transmission on the sidelink; a transmission mode of the sidelink; a demodulation reference signal position of the sidelink; an operating frequency band of the sidelink; a type of an operating carrier of the sidelink; or a mapping mode of a sidelink transmission resource. Capabilities of the second terminal for processing different types of sidelink scheduling information of different types of network devices may be determined based on the foregoing time domain configuration, the foregoing frequency domain configuration, and another related setting.

In a possible implementation, the processing capability may include: processing time type indication information or a processing time $K_t$ from a time at which the second terminal receives the last symbol of sidelink control information associated with the sidelink data sent by the first terminal to a time at which the second terminal completes demodulation of the sidelink data; and the processing time type indication information is used to indicate the processing time $K_t$ corresponding to the processing capability of the second terminal. The second terminal may determine, depending on whether a time $K_t$ at which the second terminal completes parsing of different types of sidelink data falls within a range acceptable by the first terminal, whether to receive the sidelink data.

In a possible implementation, the sidelink control information includes a delay requirement K corresponding to the sidelink data. That the second terminal receives the sidelink data on the sidelink based on the processing capability of the second terminal may include: The second terminal determines, based on the delay requirement K corresponding to the sidelink data and the processing capability of the second terminal, whether to receive the sidelink data or whether to send feedback information for the sidelink data. The second terminal may determine, depending on whether the second terminal can complete demodulation of different types of sidelink data within a specified delay requirement, whether to receive the sidelink data.

In a possible implementation, the determining whether to demodulate the sidelink data or whether to send feedback information for the sidelink data may include: If the processing time $K_t$ of the second terminal is not greater than the delay requirement K corresponding to the sidelink data, the second terminal determines to receive the sidelink data or to send the feedback information for the sidelink data; or if the processing time K of the second terminal is greater than the delay requirement K corresponding to the sidelink data, the second terminal determines not to receive the sidelink data, or not to send the feedback information for the sidelink data, or to send NACK feedback information for the sidelink data. The second terminal may determine, depending on whether the second terminal can complete demodulation of different types of sidelink data within a specified delay requirement, whether to receive the sidelink data.

According to a third aspect, a first terminal is provided. The terminal has a function of implementing the method according to any one of the possible implementations of the first aspect. The function may be implemented by hardware, or may be implemented by hardware by executing corresponding software. The hardware or the software includes one or more modules corresponding to the foregoing function.

According to a fourth aspect, a second terminal is provided. The terminal has a function of implementing the method according to any one of the possible implementations of the second aspect. The function may be implemented by hardware, or may be implemented by hardware by executing corresponding software. The hardware or the software includes one or more modules corresponding to the foregoing function.

This application provides a first terminal. The first terminal may include a memory, configured to store computer-executable instructions; and a processor, configured to execute the computer-executable instructions to implement the data transmission method according to any one of the possible implementations of the first aspect or the second aspect.

This application provides a computer-readable storage medium. The computer-readable storage medium stores computer-executable instructions, and when the computer-executable instructions are executed by a processor, the data transmission method according to any one of the possible implementations of the first aspect or the second aspect is implemented.

DETAILED DESCRIPTION OF ILLUSTRATIVE EMBODIMENTS

Embodiments of this application provide a data transmission method, applied to a terminal. The terminal in the method is an electronic device having a communication function. The terminal may be a vehicle-mounted terminal, that is, may be integrated into a position of a vehicle. For example, the vehicle-mounted terminal is integrated into a main console part of the vehicle in the integrated mode. A person skilled in the art should clearly know that the vehicle-mounted terminal may be integrated into any position of the main console of the vehicle, or may be integrated in another position except the main console. This is not limited in the embodiments of this application. The terminal in the method may alternatively be an independent terminal, for example, a portable terminal. The portable terminal may be a smartphone, a tablet computer, a mobile phone, a personal digital assistant (PDA), a portable multimedia player (PDA), a camera, a wearable device (for example, a head-mounted device (HMD), an electronic clothing, an electronic band, an electronic necklace, an electronic application accessory, or a smartwatch), or another portable device. The terminal may alternatively be a roadside terminal, for example, a signal light, a traffic light, a road sign, or a road warning sign. This is not limited in the embodiments of this application.

A first network device in the method may be a network device in a long term evolution (LTE) mobile communications system or a network device in a wideband code division multiple access (WCDMA) mobile communications system, or may be a network device in a 5G (fifth generation mobile communications technology) mobile communications system. The first network device may be a base station, a relay station, or a mobility management entity MME, or may be another network side device. Specific existence forms and communications system backgrounds of the terminal and the first network device are not limited in the embodiments of this application.

Optionally, a communications link between terminals may be a device-to-device (D2D) communications link or a sidelink. In the Internet of Vehicles, a communications link between terminals may alternatively be a vehicle-to-vehicle (V2V) link, a vehicle-to-pedestrian (Vehicle-to-Pedestrian, V2P) link, a vehicle-to-infrastructure (V2I) link, or a vehicle-to-everything (Vehicle-to-X, V2X) link. In the following embodiments of this application, mainly, a sidelink/first link is used to describe communication and transmission between terminals, and a cellular link/second link is used to describe communication and transmission between a network device and a terminal. Communication in at least one of a unicast mode, a multicast mode, or a broadcast mode between terminals may be performed on the sidelink.

Figure 1:
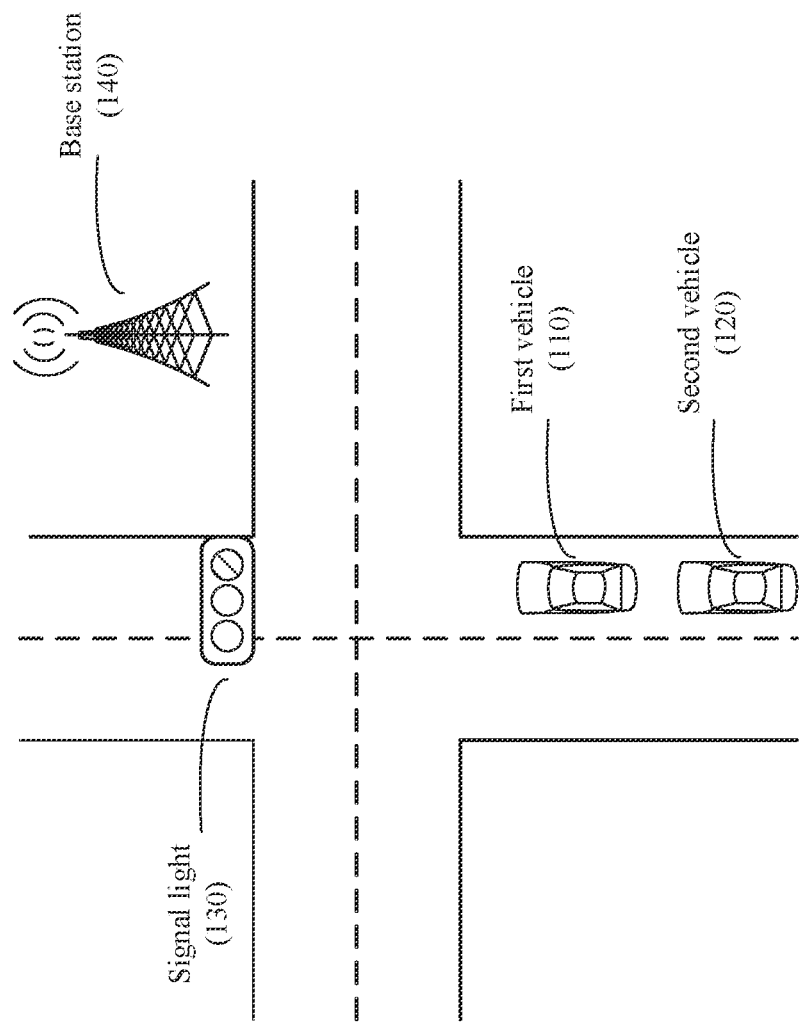
FIG. 1 is a first schematic diagram of an application scenario for a data transmission method according to an embodiment of this application.

For example, the terminal is a vehicle-mounted terminal or a roadside terminal, and the first network device is a base station. FIG. 1 is a first schematic diagram of an application scenario for a data transmission method according to an embodiment of this application. The application scenario is a crossroads with a signal indicator. The application scenario may include a first vehicle 110, a second vehicle 120, a signal light 130, and a base station 140. A first vehicle-mounted terminal and a second vehicle-mounted terminal are respectively integrated into the first vehicle no and the second vehicle 120. A roadside terminal is integrated into the signal light 130. The base station 140 is a 5G base station (a gNB). The roadside terminal supports NR V2X. The first vehicle-mounted terminal and the second vehicle-mounted terminal support only LTE V2X. When the first vehicle 110 and the second vehicle 120 travel close to the crossroads, the signal light 130 needs to send signal indicator information to the first vehicle no and the second vehicle 120, to remind the first vehicle 110 and the second vehicle 120 to take a corresponding measure based on the signal indicator information. For example, when the signal indicator is a red light, braking is selected; when the signal indicator is a yellow light, acceleration is selected to pass through the crossroads; or when the signal indicator is green, a constant speed is selected to pass through the crossroads. However, because the first vehicle-mounted terminal and the second vehicle-mounted terminal on the first vehicle 110 and the second vehicle 120 support only LTE V2X, to enable the signal light 130 to successfully transmit the signal indicator information to the first vehicle 110 and the second vehicle 120, the base station 140 needs to send, to the roadside terminal of the signal light 130, indication information for performing data transmission on an LTE sidelink, and the roadside terminal of the signal light 130 implements, based on the indication information sent by the base station 140, data transmission on LTE sidelinks from the roadside terminal of the signal light 130 to the first vehicle-mounted terminal of the first vehicle 110 and the second vehicle-mounted terminal of the second vehicle 120.

Figure 2:
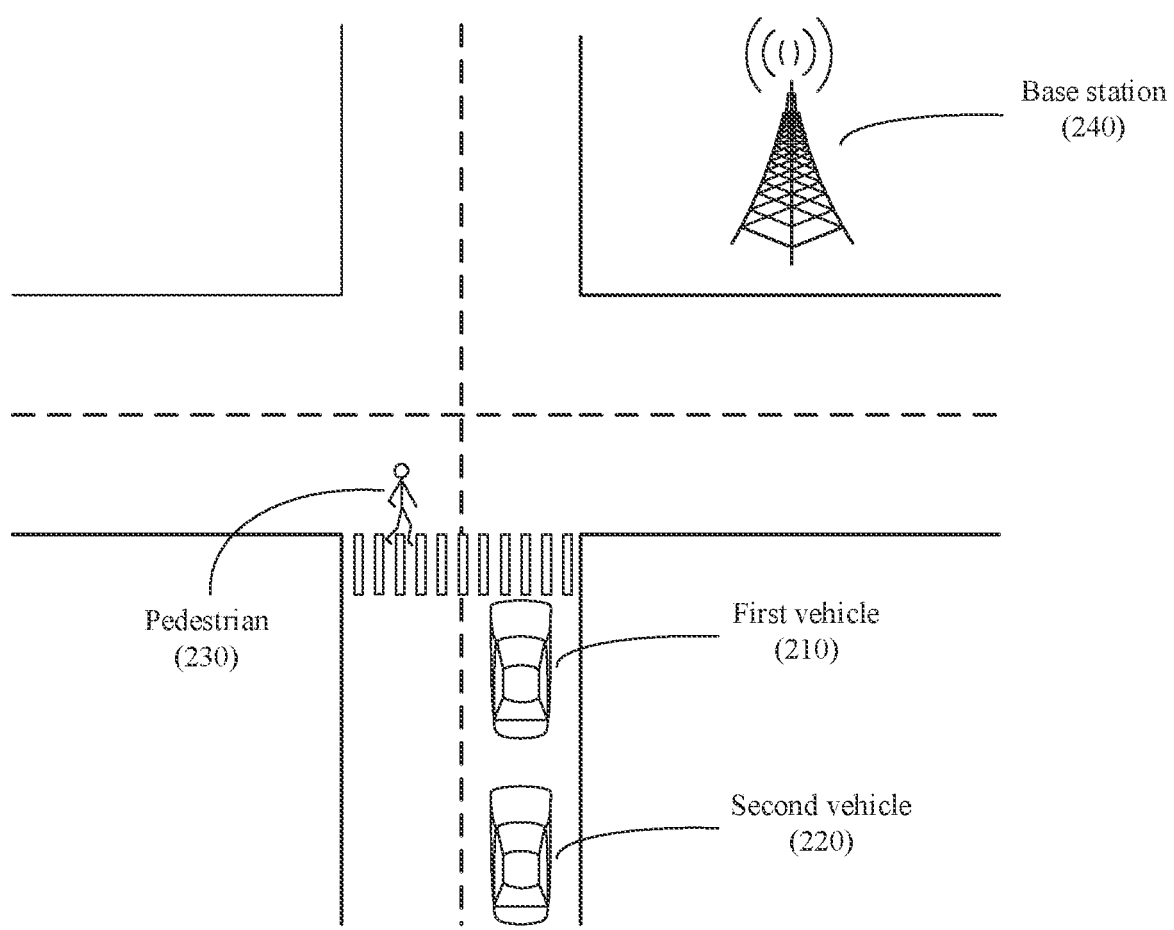
FIG. 2 is a second schematic diagram of an application scenario for a data transmission method according to an embodiment of this application.

For example, the terminal is a vehicle-mounted terminal or a portable terminal, and the first network device is a base station. FIG. 2 is a second schematic diagram of an application scenario for a data transmission method according to an embodiment of this application. The application scenario is a crossroads without a signal indicator. The application scenario may include a first vehicle 210, a second vehicle 220, a pedestrian 230, and a base station 240. A first vehicle-mounted terminal and a second vehicle-mounted terminal are respectively integrated into the first vehicle 210 and the second vehicle 220. The pedestrian 230 carries a smartphone. The base station 240 is a 4G base station (an eNB), the smartphone supports only NR V2X, the first vehicle-mounted terminal supports LTE V2X and NR V2X, and the second vehicle-mounted terminal supports only LTE V2X. When the first vehicle 210 travels close to the crossroads, the pedestrian 230 is crossing the road, and the smartphone carried by the pedestrian 230 needs to send passing information of the pedestrian 230 to the first vehicle 210, to remind the first vehicle 210 to take a corresponding measure to maintain a safe distance from the pedestrian 230, for example, perform braking or deceleration based on a distance between the pedestrian 230 and the first vehicle 210 and a passing speed of the pedestrian 230. The first vehicle 210 may further send the distance between the first vehicle 210 and the pedestrian 230 to the second vehicle 220, so that the second vehicle 220 can take a deceleration or braking measure in advance to maintain a safe distance from the first vehicle 210. However, because the smartphone supports only NR V2X, to enable the pedestrian 230 to successfully transmit the passing information to the first vehicle 210, the base station 240 needs to send, to the smartphone carried by the pedestrian 230, indication information for performing data transmission on an NR sidelink, and the smartphone carried by the pedestrian 230 may implement, based on the indication information sent by the base station 240, data transmission on an NR sidelink from the smartphone carried by the pedestrian 230 to the first vehicle-mounted terminal of the first vehicle 210. In addition, because the second vehicle-mounted terminal on the second vehicle 220 supports only LTE V2X, to enable the first vehicle 210 to successfully transmit information about the distance between the first vehicle 210 and the pedestrian 230 to the second vehicle 220, the base station 240 needs to send, to the first vehicle-mounted terminal of the first vehicle 210, indication information for performing data transmission on an LTE sidelink, and the first vehicle-mounted terminal of the first vehicle 210 may implement data transmission on an LTE sidelink from the first vehicle-mounted terminal of the first vehicle 210 to the second vehicle-mounted terminal of the second vehicle 220 based on the indication information sent by the base station 240.

Figure 3:
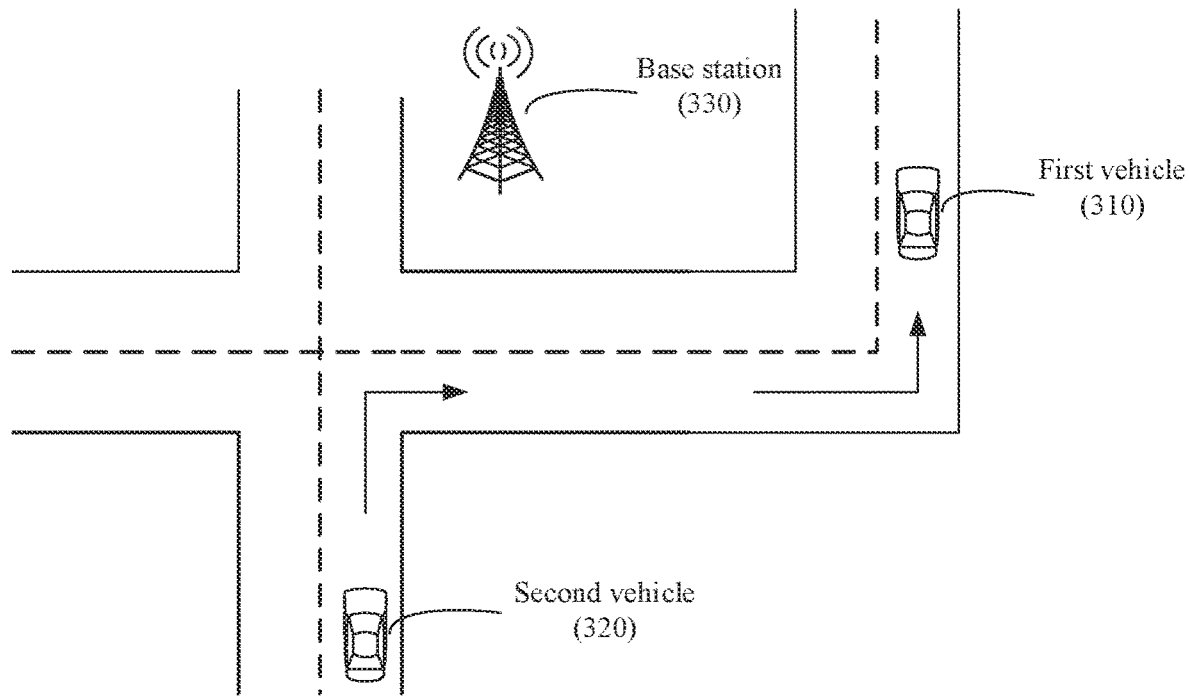
FIG. 3 is a third schematic diagram of an application scenario for a data transmission method according to an embodiment of this application.

For example, the terminal is a vehicle-mounted terminal, and the first network device is a base station. FIG. 3 is a third schematic diagram of an application scenario for a data transmission method according to an embodiment of this application. The application scenario is vehicle following. For example, two drivers agree to drive a first vehicle 310 and a second vehicle 320 respectively to a same destination together. However, because vehicle speeds are different, and road conditions that the first vehicle 310 and the second vehicle 320 encounter change continuously, the first vehicle 310 and the second vehicle 320 cannot keep route synchronization, and cannot learn of a position of the other party. Therefore, the front vehicle may notify the rear vehicle of driving information of the front vehicle at a key intersection such as a turn or a U-turn, so that the rear vehicle can smoothly follow the front vehicle based on the driving information of the front vehicle, to prevent the rear vehicle from being lost. The application scenario may further include a base station 330. A first vehicle-mounted terminal and a second vehicle-mounted terminal are respectively integrated into the first vehicle 310 and the second vehicle 320. The base station 330 is a 5G base station (a gNB). The first vehicle-mounted terminal supports only LTE V2X, and the second vehicle-mounted terminal supports LTE V2X. Therefore, to enable the first vehicle 310 to successfully transmit driving information to the second vehicle 320, the base station 330 needs to send, to the first vehicle-mounted terminal of the first vehicle 310, indication information for performing data transmission on an LTE sidelink, and the first vehicle-mounted terminal of the first vehicle 310 implements data transmission on an LTE sidelink from the first vehicle-mounted terminal of the first vehicle 310 to the second vehicle-mounted terminal of the second vehicle 320 based on the indication information sent by the base station 330.

The application scenarios shown in FIG. 1 to FIG. 3 are merely examples. A person skilled in the art needs to know that the data transmission method in the embodiments of this application is not limited to the foregoing application scenarios. In addition, the terminal in the data transmission method in the embodiments of this application is not limited to the foregoing listed terminal forms, and the terminal may alternatively be a combination of any of the foregoing terminal forms.

When the terminal implements data transmission on a sidelink to another terminal based on the indication information of the network device, some terminals perform data transmission on an LTE sidelink based on an indication of the network device in the LTE mobile communications system. For example, in FIG. 2, the first vehicle-mounted terminal of the first vehicle 210 implements data transmission on the LTE sidelink to the second vehicle-mounted terminal of the second vehicle 220 based on the indication information sent by the base station 240. Some terminals perform data transmission on an NR sidelink based on an indication of the network device in the LTE mobile communications system. For example, in FIG. 2, the smartphone carried by the pedestrian 230 implements data transmission on the NR sidelink to the first vehicle-mounted terminal of the first vehicle 210 based on the indication information sent by the base station 240. Some terminals perform data transmission on an LTE sidelink based on an indication of a network device in a 5G NR mobile communications system. For example, in FIG. 3, the first vehicle-mounted terminal of the first vehicle 310 implements data transmission on the LTE sidelink to the second vehicle-mounted terminal of the second vehicle 320 based on the indication information sent by the base station 330. During actual application, data transmission on the NR sidelink may alternatively be performed based on the indication of the network device in the 5G NR mobile communications system.

Figure 4:
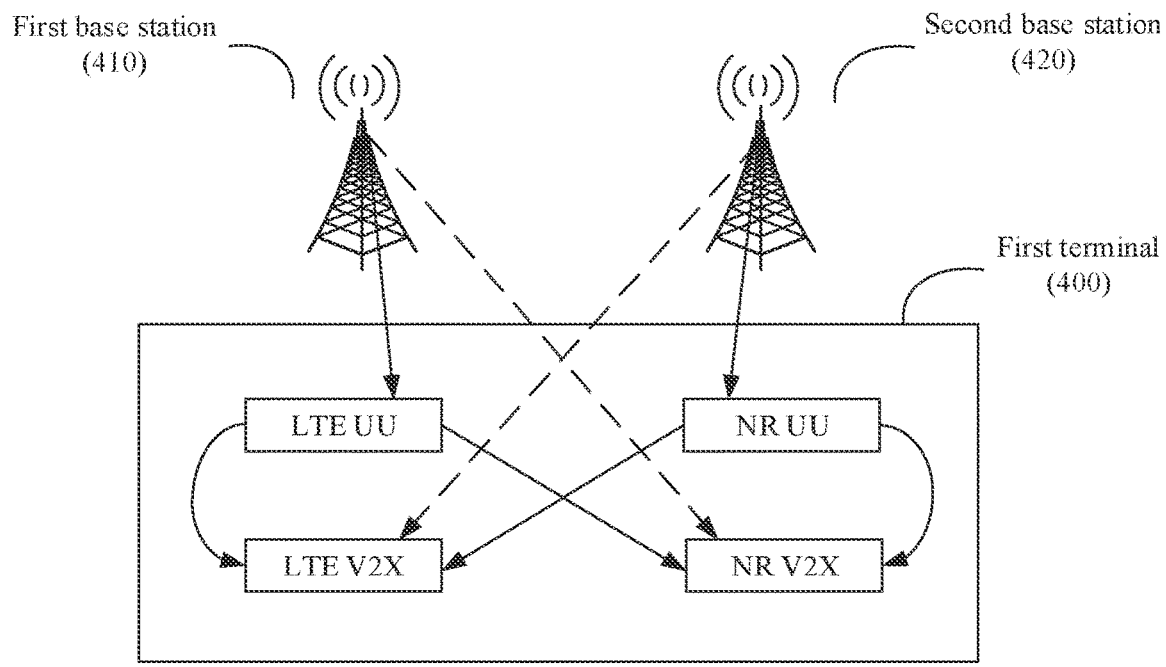
FIG. 4 is a first schematic diagram of an implementation method of a data transmission method according to an embodiment of this application.

In some embodiments of this application, a first terminal 400 may be scheduled a sidelink through a cellular link. FIG. 4 is a first schematic diagram of an implementation method of a data transmission method according to an embodiment of this application. As shown in FIG. 4, a first base station 410 is an eNB, a second base station 420 is a gNB, and the first terminal 400 can support both data transmission on an LTE sidelink and data transmission on an NR sidelink. In this case, the first terminal 400 may not only support accepting scheduling of the gNB to perform data transmission on the LTE sidelink, but also support accepting scheduling of the gNB to perform data transmission on the NR sidelink; and may not only support accepting scheduling of the eNB to perform data transmission on the LTE sidelink, but also support accepting scheduling of the eNB to perform data transmission on the NR sidelink. When being scheduled by the eNB to perform data transmission on the NR sidelink, NR V2X may be scheduled by LTE UU of the terminal. When being scheduled by the gNB to perform data transmission on the LTE sidelink, LTE V2X may be scheduled by NR UU of the terminal.

Figure 5:
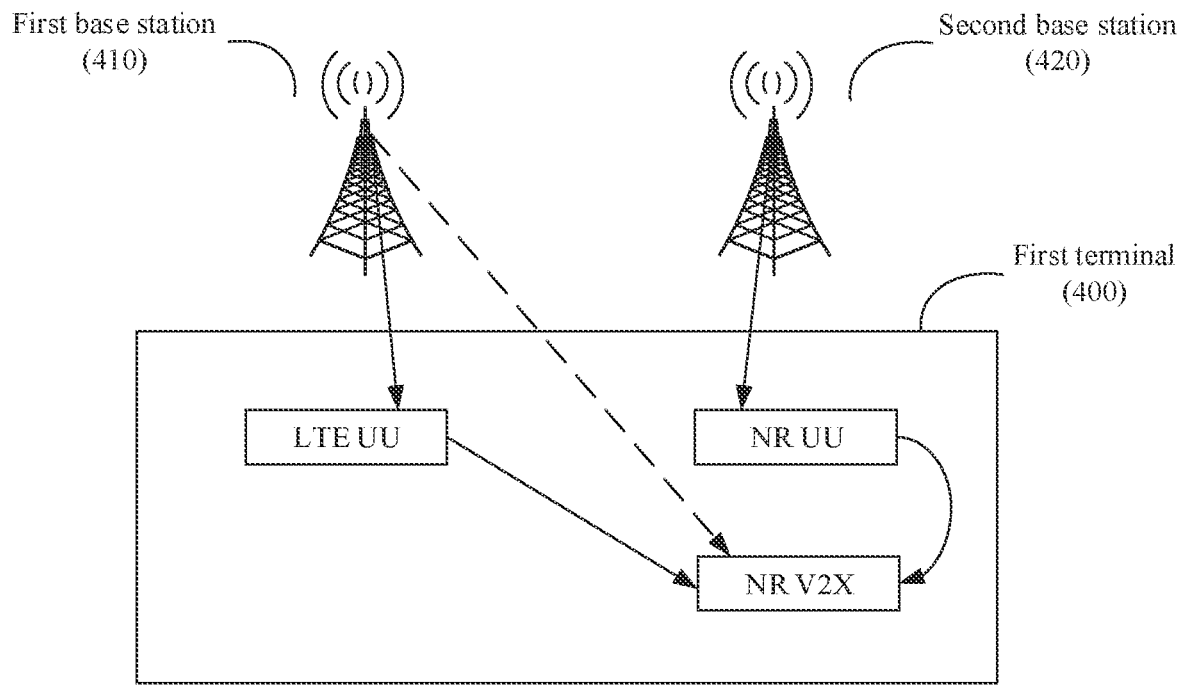
FIG. 5 is a second schematic diagram of an implementation method of a data transmission method according to an embodiment of this application.

FIG. 5 is a second schematic diagram of an implementation method of a data transmission method according to an embodiment of this application. As shown in FIG. 5, a first base station 410 is an eNB, a second base station 420 is a gNB, and a first terminal 400 supports only data transmission on an NR sidelink. In this case, the first terminal 400 may support accepting scheduling of the gNB to perform data transmission on the NR sidelink, and be scheduled by the eNB to perform data transmission on the NR sidelink. NR V2X can be scheduled by both NR UU and LTE UU.

Figure 6:
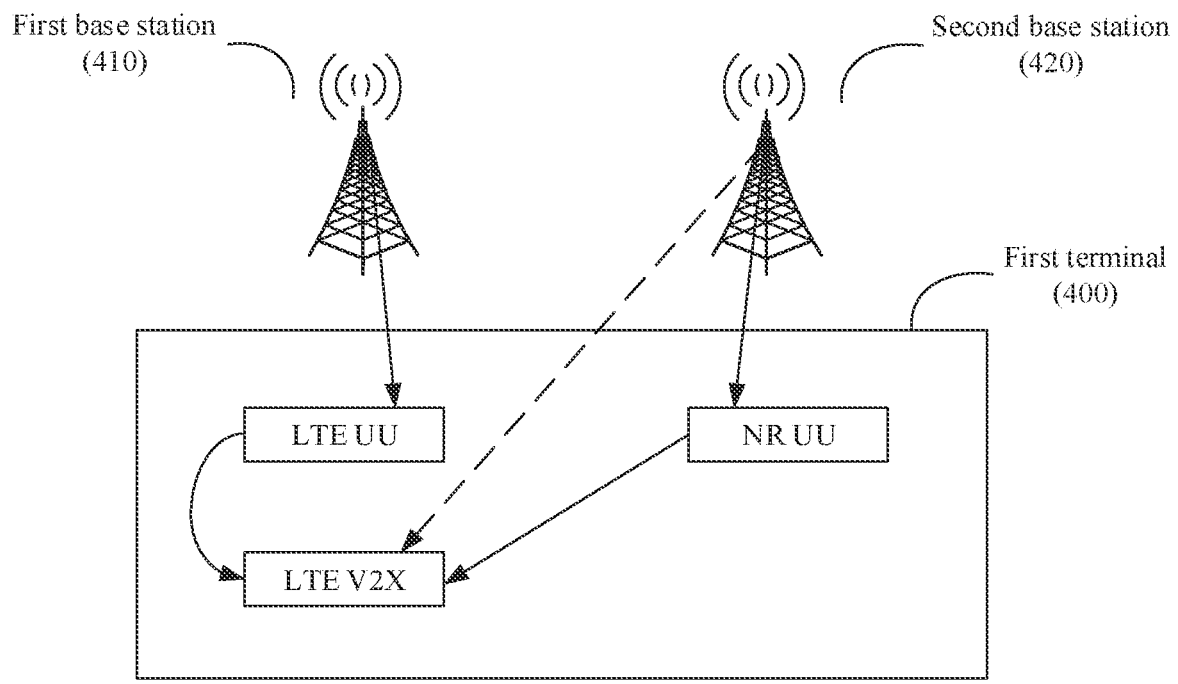
FIG. 6 is a third schematic diagram of an implementation method of a data transmission method according to an embodiment of this application.

FIG. 6 is a third schematic diagram of an implementation method of a data transmission method according to an embodiment of this application. As shown in FIG. 6, a first base station 410 is an eNB, a second base station 420 is a gNB, and a first terminal 400 supports only data transmission on an LTE sidelink. In this case, the first terminal 400 may support accepting scheduling of the gNB to perform data transmission on the LTE sidelink, and be scheduled by the eNB to perform data transmission on the LTE sidelink. LTE V2X can be scheduled by both NR UU and LTE UU.

A person skilled in the art should know that the implementation methods in FIG. 4 and FIG. 5 are merely examples, and do not constitute a limitation on an actual scheduling process. That is, during actual data transmission, alternatively, another unit may schedule LTE V2X or NR V2X to implement the data transmission method.

Figure 7:
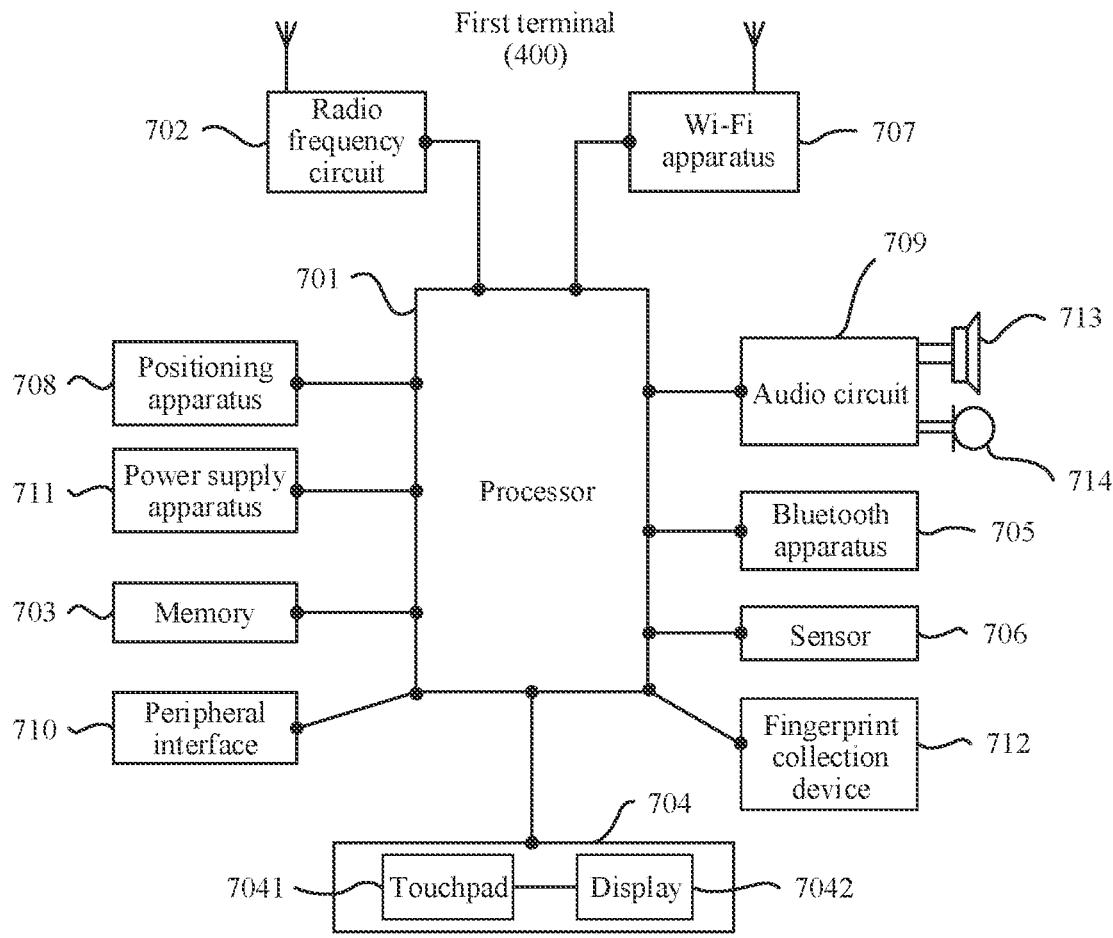
FIG. 7 is a schematic structural diagram of a smartphone terminal according to an embodiment of this application.

As shown in FIG. 7, an example in which the first terminal 400 is a smartphone is used for description in the embodiments of this application. It should be understood that the smartphone shown in FIG. 7 is only an example of the first terminal 400, and the smartphone may have more or fewer components than those shown in the figure, or two or more components may be combined, or the smartphone may have different component arrangements.

As shown in FIG. 7, the first terminal 400 may specifically include components such as a processor 701, a radio frequency (RF) circuit 702, a memory 703, a touchscreen 704, a Bluetooth apparatus 705, one or more sensors 706, a Wi-Fi apparatus 707, a positioning apparatus 708, an audio circuit 709, a peripheral interface 710, a power supply apparatus 711, a fingerprint collection device 712, a speaker 713, and a microphone 714. These components may communicate with each other by using one or more communications buses or signal lines (not shown in FIG. 7). A person skilled in the art may understand that a hardware structure shown in FIG. 7 does not constitute a limitation on the smartphone, and the first terminal 400 may include more or fewer components than those shown in the figure, or some components may be combined, or the first terminal 400 may have different component arrangements.

The following describes each component of the first terminal 400 in detail with reference to FIG. 7.

The processor 701 is a control center of the first terminal 400, is connected to all parts of the first terminal 400 by using various interfaces and lines, and performs various functions of the first terminal 400 and data processing by running or executing an application client-side program (which may be referred to as an App for short below) stored in the memory 703 and by invoking data stored in the memory 703. In some embodiments, the processor 701 may be a general-purpose central processing unit (CPU), a microprocessor, an application-specific integrated circuit (ASIC), or one or more integrated circuits configured to control program execution of the solutions of this application. The processor 701 may include one or more CPUs. For example, the processor 701 may be a Kirin 960 chip manufactured by Huawei Technologies Co., Ltd.

The radio frequency circuit 702 may be configured to: receive and send a radio signal in an information sending/receiving process or a call process. Particularly, after receiving downlink data from a base station, the radio frequency circuit 702 may send the downlink data to the processor 701 for processing, and sends related uplink data to the base station. The radio frequency circuit usually includes but is not limited to an antenna, at least one amplifier, a transceiver, a coupler, a low noise amplifier, a duplexer, and the like. In addition, the radio frequency circuit 702 may further communicate with another device through wireless communication. The wireless communication may use any communication standard or protocol, including but not limited to a global system for mobile communications, a general packet radio service, code division multiple access, wideband code division multiple access, long term evolution, an e-mail, an SMS message service, and the like.

The memory 703 is configured to store an application program and data. The memory 703 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a disk storage medium or another magnetic storage device, or any other medium that can be configured to carry or store expected program code in a form of an instruction or a data structure and that can be accessed by a computer. However, this is not limited thereto. The processor 701 performs various functions of the first terminal 400 and data processing by running the application program and the data that are stored in the memory 703. The memory 703 mainly includes a program storage area and a data storage area. The program storage area may store an operating system, and an application program required by at least one function (such as a sound playback function or an image playback function). The data storage area may store data (for example, audio data or a phone book) created based on use of the first terminal 400. The memory 703 may store instructions used to implement three modular functions: a receiving instruction, a transmission instruction, and a sending instruction, and the processor 701 controls execution of the instructions. The processor 701 is configured to execute a computer-executable instruction stored in the memory 703, to implement a data transmission method provided in the following embodiments of this application. In addition, the memory 703 may include a high-speed random access memory, and may further include a nonvolatile memory such as a magnetic disk storage device, a flash memory device, or another volatile solid-state storage device. The memory 703 may store various operating systems such as an iOS operating system developed by Apple and an Android operating system developed by Google.

The touchscreen 704 may include a touchpad 7041 and a display 7042. The touchpad 7041 may collect a touch event performed by a user of the first terminal 400 on or near the touchpad 7041 (for example, an operation performed by the user on the touchpad 7041 or near the touchpad 7041 by using any proper object, for example, a finger or a stylus), and send collected touch information to another component such as the processor 701. Although the touchpad 7041 and the display 7042 in FIG. 7 are used as two independent components to implement input and output functions of the first terminal 400, in some embodiments, the touchpad 7041 and the display 7042 may be integrated to implement the input and output functions of the first terminal 400. It may be understood that the touchscreen 704 is formed by stacking a plurality of layers of materials. In this embodiment of this application, only the touchpad (layer) and a display screen (layer) are displayed, and another layer is not recorded in this embodiment of this application. In addition, in some other embodiments of this application, the touchpad 7041 may cover the display 7042, and a size of the touchpad 7041 is greater than a size of the display 7042, so that the display 7042 is completely covered by the touchpad 7041. Alternatively, the touchpad 7041 may be disposed on a front face of the first terminal 400 in a form of a full panel, in other words, touch of the user on the front face of the first terminal 400 can be sensed by the smartphone. Therefore, full touch experience on the front face of the smartphone can be implemented. In some other embodiments, the touchpad 7041 is disposed on a front face of the first terminal 400 in a full panel form, and the display 7042 may also be disposed on the front face of the first terminal 400 in a full panel form. Therefore, a bezel-less structure can be implemented on the front face of the smartphone.

In this embodiment of this application, the first terminal 400 may further have a fingerprint recognition function. For example, the fingerprint collection device 712 may be disposed on a back face (for example, below a rear-facing camera) of the first terminal 400, or may be disposed on the front face (for example, below the touchscreen 704) of the first terminal 400. For another example, the fingerprint collection device 712 may be disposed on the touchscreen 704 to implement the fingerprint recognition function. In other words, the fingerprint collection device 712 may be integrated with the touchscreen 704 to implement the fingerprint recognition function of the first terminal 400. In this case, the fingerprint collection device 712 is disposed on the touchscreen 704, and may be a part of the touchscreen 704, or may be disposed on the touchscreen 704 in another mode. A main component of the fingerprint collection device 712 in this embodiment of this application is a fingerprint sensor. The fingerprint sensor may use any type of sensing technology, including but not limited to an optical sensing technology, a capacitive sensing technology, a piezoelectric sensing technology, an ultrasonic sensing technology, or the like.

In this embodiment of this application, the first terminal 400 may further include the Bluetooth apparatus 705, configured to implement data exchange between the first terminal 400 and another terminal (for example, a smartphone or a smartwatch) in a short distance from the first terminal 400. In this embodiment of this application, the Bluetooth apparatus may be an integrated circuit, a Bluetooth chip, or the like.

The Wi-Fi apparatus 707 is configured to provide network access complying with a Wi-Fi related standard and protocol for the first terminal 400. The first terminal 400 may access a Wi-Fi access point by using the Wi-Fi apparatus 707, to help the user receive and send e-mails, browse a web page, access streaming media, and so on. The Wi-Fi apparatus 707 provides wireless broadband Internet access for the user. In some other embodiments, the Wi-Fi apparatus 707 may also be used as a Wi-Fi wireless access point, to provide Wi-Fi network access for another terminal.

The first terminal 400 may further include at least one sensor 706, such as a light sensor, a motion sensor, and another sensor. Specifically, the light sensor may include an ambient light sensor and a proximity sensor. The ambient light sensor may adjust luminance of the display of the touchscreen 704 based on intensity of ambient light. The proximity sensor may power off the display when the first terminal 400 moves to an ear. As one type of motion sensor, an accelerometer sensor may detect acceleration values in all directions (usually on three axes). The accelerometer sensor may detect a value and a direction of gravity when the accelerometer sensor is stationary, and may be used in an application for recognizing a smartphone posture (such as switching between a landscape mode and a portrait mode, a related game, or magnetometer posture calibration), a function related to vibration recognition (such as a pedometer or a knock), or the like. For another sensor that may be further disposed on the first terminal 400, such as a gyroscope, a barometer, a hygrometer, a thermometer, or an infrared sensor, details are not described herein.

The positioning apparatus 708 is configured to provide a geographical position for the first terminal 400. It may be understood that the positioning apparatus 708 may be specifically a receiver of a positioning system such as a global positioning system (GPS), a BeiDou navigation satellite system, or a Russian GLONASS. After receiving the geographical position sent by the positioning system, the positioning apparatus 708 sends the information to the processor 701 for processing, or sends the information to the memory 703 for storage. In some other embodiments, the positioning apparatus 708 may alternatively be a receiver of an assisted global positioning system (AGPS). The AGPS system serves as an assisted server to assist the positioning apparatus 708 in completing ranging and positioning services. In this case, the assisted positioning server communicates, by using a wireless communications network, with the positioning apparatus 708 (namely, a GPS receiver) of the terminal such as the first terminal 400 and provides positioning assistance. In some other embodiments, the positioning apparatus 708 may alternatively be an apparatus using a positioning technology based on a Wi-Fi access point. Each Wi-Fi access point has a globally unique MAC address, and the terminal can scan and collect a broadcast signal of a surrounding Wi-Fi access point when Wi-Fi is enabled. Therefore, the terminal can obtain a MAC address broadcast by the Wi-Fi access point. The terminal sends, to a location server by using a wireless communications network, such data (for example, the MAC address) that can identify the Wi-Fi access point. The location server retrieves a geographical position of each Wi-Fi access point, calculates a geographical position of the terminal with reference to strength of the Wi-Fi broadcast signal, and sends the geographical position of the terminal to the positioning apparatus 708 of the terminal.

The audio circuit 709, the speaker 713, and the microphone 714 may provide an audio interface between the user and the first terminal 400. The audio circuit 709 may convert received audio data into an electrical signal and then transmit the electrical signal to the speaker 713, and the speaker 713 converts the electrical signal into a sound signal for output. In addition, the microphone 714 converts a collected sound signal into an electrical signal. The audio circuit 709 receives the electrical signal, converts the electrical signal into audio data, and then outputs the audio data to the RF circuit 702, to send the audio data to, for example, another smartphone, or outputs the audio data to the memory 703 for further processing.

The peripheral interface 710 is configured to provide various interfaces for an external input/output device (for example, a keyboard, a mouse, an external display, an external memory, or a subscriber identification module card). For example, the peripheral interface 710 is connected to the mouse through a universal serial bus (USB) interface, and the peripheral interface 710 is connected, by using a metal contact on a card slot of the subscriber identification module card, to the subscriber identification module (SIM) card provided by a telecommunications operator. The peripheral interface 710 may be configured to couple the external input/output peripheral device to the processor 701 and the memory 703.

The first terminal 400 may further include the power supply apparatus 711 (for example, a battery or a power management chip) that supplies power to the components. The battery may be logically connected to the processor 701 by using the power management chip, so that the power supply apparatus 711 implements functions such as charging and discharging management and power consumption management.

Although not shown in FIG. 7, the first terminal 400 may further include a camera (a front-facing camera and/or the rear-facing camera), a flash, a micro projection apparatus, a near field communications (NFC) apparatus, and the like. Details are not described herein.

The following describes in detail the data transmission method provided in the embodiments of this application with reference to FIG. 1 to FIG. 7. A basic principle of the method is as follows: A terminal performs sidelink transmission based on indication information that is sent by a first network device and that is used to indicate to perform sidelink transmission, and with reference to a processing capability of the terminal, by using information that is used to configure sidelink transmission and that is in the indication information.

In some embodiments of this application, when the first terminal 400 needs to perform sidelink transmission with another terminal, to share information such as a real-time position of the first terminal 400 or an obstacle within a specific distance, the network device in the mobile communications system sends, to the first terminal 400, indication information used to indicate the first terminal 400 to perform sidelink transmission.

Figure 8:
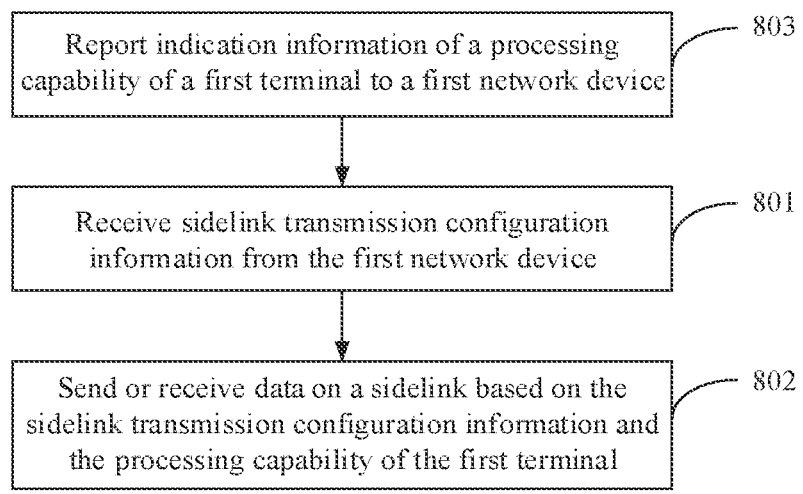
FIG. 8 is a flowchart of a data transmission method according to an embodiment of this application.

FIG. 8 shows a data transmission method according to an embodiment of this application. The method is applied to a first terminal 400, and the method may include the following steps 801 and 802.

801. A processor 701 of the first terminal 400 executes a receiving instruction in a memory 703, to receive sidelink transmission configuration information from a first network device through a cellular link.

The sidelink transmission configuration information is used to indicate the first terminal 400 to perform sidelink transmission based on the sidelink transmission configuration information. For example, the sidelink transmission configuration information may be sent by a network device in an LTE mobile communications system, and is used to indicate the first terminal 400 to perform data transmission on an NR sidelink or data transmission on an LTE sidelink, or may be sent by a network device in a 5G NR mobile communications system, and is used to indicate the first terminal 400 to perform data transmission on an LTE sidelink or data transmission on an NR sidelink.

The sidelink transmission configuration information may include time domain resource configuration information and frequency domain resource configuration information. When performing sidelink transmission, the first terminal 400 may perform sidelink transmission by using a time domain resource specified by the time domain resource configuration information and a frequency domain resource specified by the frequency domain resource configuration information.

Optionally, the sidelink transmission configuration information may include resource pool information, and the resource pool information may include but is not limited to available frequency information, a system bandwidth, and a TDD subframe configuration mode. The first terminal 400 may determine the time domain resource configuration information based on the TDD subframe configuration mode, and determine the frequency domain resource configuration information based on the available frequency information and the system bandwidth. When performing sidelink transmission, the first terminal 400 performs sidelink transmission based on the determined time domain resource configuration information and frequency domain resource configuration information.

Optionally, when the first terminal 400 being scheduled a sidelink through a cellular link, the sidelink transmission configuration information may further include: a mode of scheduling a sidelink through a cellular link, where the mode of scheduling a sidelink through a cellular link is indicated by using at least one of an RRC or SIB message, a DCI format, signaling in DCI, or an RNTI corresponding to the DCI; and the mode of scheduling a sidelink through a cellular link includes at least one of the following: indicating, through an LTE cellular link, the first terminal to send or receive data on an LTE sidelink; indicating, through an LTE cellular link, the first terminal to send or receive data on an NR sidelink; indicating, through an NR cellular link, the first terminal to send or receive data on an NR sidelink; or indicating, through an NR cellular link, the first terminal to send or receive data on an LTE sidelink.

Optionally, the sidelink transmission configuration information may be sent by the network device to the terminal by using a system information block (System Information Block, SIB), or may be sent by the network device to the terminal by using radio resource control (RRC) or downlink control information (DCI).

For example, when the sidelink transmission configuration information is sent by the network device to the first terminal 400 by using a SIB message or an RRC message, a physical downlink shared channel (PDSCH) may be used to carry the SIB message or the RRC message. For an SIB1 message, when the sidelink transmission configuration information is sent by the network device to the first terminal 400 by using a SIB message, the network device sends the SIB1 message based on a fixed periodicity and a fixed sending moment by using a SystemInformationBlockType1 message, or broadcasts a SIB2 message to a SIB12 message in an independent SI window by using system information (SI). In this process, the SIB message may be scrambled by using an SI-RNTI. After receiving the SIB message, the first terminal 400 needs to parse the SIB message.

When parsing the SIB message, the first terminal 400 needs to parse the SystemInformationBlockType1 message at a specified moment. For the SI, the following steps need to be performed for parsing:

1. Determine a sequence number n of the SI message in a SIB.

2. Calculate x according to a formula $x=(n-1)*w$, where w is a length si-WindowLength of an SI window.

3. Calculate a start subframe according to a formula $a=x \bmod 10$, and determine a system frame number SFN according to a formula $SFN \bmod T = FLOOR(x/10)$, where T is a periodicity si-Periodicity of the SI message.

After obtaining a start frame number and the system frame number of the SI window, the first terminal 400 can clearly learn of parsing moments of all SIB blocks.

For example, when the sidelink transmission configuration information is sent by the network device to the first terminal 400 by using DCI, the network device uses a physical downlink control channel (PDCCH) to carry the DCI. When parsing the DCI, the first terminal 400 needs to first parse the DCI at a physical layer and then transmit the DCI to a media access control (MAC) layer for parsing. A time at which the first terminal 400 parses the DCI is related to a processing capability of the first terminal 400.

Specifically, that the first terminal 400 parses the SIB message, the RRC, or the DCI may include demodulating and decoding the SIB message, the RRC, or the DCI.

802. The processor 701 of the first terminal 400 executes a transmission instruction in the memory 703, to send or receive data on the sidelink based on the sidelink transmission configuration information and the processing capability of the first terminal 400.

Optionally, the processing capability may include at least one of the following: the first terminal 400 supports the first network device in indicating, through the LTE cellular link, the first terminal 400 to perform data transmission on the NR sidelink; the first terminal 400 supports the first network device in indicating, through the NR cellular link, the first terminal 400 to perform data transmission on the LTE sidelink; or the first terminal 400 supports the first network device in indicating, through the NR cellular link, the first terminal 400 to perform data transmission on the NR sidelink.

When sending or receiving the data on the sidelink based on the processing capability of the first terminal 400, the first terminal 400 determines, by considering the capability of the first terminal 400, whether to receive current sidelink scheduling. For example, the sidelink transmission configuration information is used to implement data transmission on the NR sidelink. However, the capability of the first terminal 400 does not support transmission on the NR sidelink. Therefore, the first terminal 400 abandons current establishment of the NR sidelink and transmission of related data. For another example, the sidelink transmission configuration information is used to implement data transmission on the LTE sidelink, and the capability of the first terminal 400 supports transmission on the LTE sidelink. Therefore, the first terminal 400 continues to perform subsequent establishment of the LTE sidelink and subsequent transmission of related data.

Further, because the sidelink transmission configuration information may be sent by the network device to the terminal by using the SIB, the RRC, or the DCI, that the first terminal 400 supports the first network device in indicating, through the LTE cellular link, the first terminal 400 to perform data transmission on the NR sidelink may include: The first terminal 400 supports the first network device in indicating, by using LTE DCI, the first terminal 400 to perform data transmission in first mode on the NR sidelink; or the first terminal 400 supports the first network device in indicating, by using LTE RRC or an LTE SIB, the first terminal 400 to perform data transmission in second mode on the NR sidelink.

That the first terminal 400 supports the first network device in indicating, through the NR cellular link, the first terminal 400 to perform data transmission on the LTE sidelink may include: The first terminal 400 supports the first network device in indicating, by using NR DCI, the first terminal 400 to perform data transmission in third mode on the LTE sidelink; or the first terminal 400 supports the first network device in indicating, by using NR RRC or an NR SIB, the first terminal 400 to perform data transmission in fourth mode on the LTE sidelink.

That the first terminal 400 supports the first network device in indicating, through the NR cellular link, the first terminal 400 to perform data transmission on the NR sidelink may include: The first terminal 400 supports the first network device in indicating, by using NR DCI, NR RRC, or an NR SIB, the first terminal 400 to perform data transmission in first or second mode on the NR sidelink.

It should be noted that when the first terminal 400 receives and processes the sidelink transmission configuration information used to indicate different data transmission modes, specific receiving and parsing processes are also different. For example, if the first network device indicates, by using the DCI, to send or receive data in first mode on the NR sidelink, after receiving the sidelink transmission configuration information, the first terminal 400 first parses the DCI based on the capability of the first terminal 400, and then performs corresponding sidelink data transmission. For another example, if the first network device indicates, by using the RRC or the SIB, to send or receive data in second mode on the NR sidelink, the first terminal 400 first parses the RRC or the SIB based on the capability of the first terminal 400, and then performs corresponding sidelink data transmission. The two processes are different, capabilities are also different when the first terminal 400 performs related parsing, and required time is naturally different.

Optionally, the processing capability of the first terminal 400 may include at least one of the following: a processing delay parameter for sending or receiving data by the first terminal 400 in first mode on the NR sidelink based on a DCI indication that is received from the first network device through the LTE cellular link; a processing delay parameter for sending or receiving data in second mode on the NR sidelink based on an RRC or SIB indication that is received from the first network device through the LTE cellular link; a processing delay parameter for sending or receiving data in third mode on the LTE sidelink based on a DCI indication that is received from the first network device through the NR cellular link; a processing delay parameter for sending or receiving data in fourth mode on the LTE sidelink based on an RRC or SIB indication that is received from the first network device through the NR cellular link; a processing delay parameter for sending or receiving data in first mode on the NR sidelink based on a DCI indication that is received from the first network device through the NR cellular link; or a processing delay parameter for sending or receiving data in second mode on the NR sidelink based on an RRC or SIB indication that is received from the first network device through the NR cellular link.

It should be noted that, processing capabilities of terminals of different brands, models, or configurations are different. When terminals of a same brand, model, or configuration are processing sidelink transmission configuration information used to indicate sending or receiving of data in different modes, specific processing capabilities are also different, and a processing time of a terminal with a stronger processing capability is shorter. When performing specific sidelink scheduling, the terminal determines, based on an actual processing capability of the terminal, including: whether sidelink data transmission is supported, a processing delay parameter, and the like, whether to perform sidelink data transmission and a time at which sidelink data transmission is started.

The processing delay parameter is used to identify a capability of the first terminal 400 for receiving/decoding/parsing RRC, a SIB, or DCI, or a capability of the first terminal 400 for performing sidelink configuration, or another processing capability. The capability may be identified by using a length of a processing time, or identified by using a processing capability level. This is not limited in this embodiment of this application.

Optionally, any one of the foregoing processing delay parameters may include processing delay parameter value indication information or a processing delay parameter type indication information; and the processing delay parameter type indication information is used to indicate a processing delay parameter type or a processing delay parameter value corresponding to the processing capability of the first terminal.

Specifically, the processing delay parameter value indication information is used to identify a processing delay parameter value or a processing delay parameter type, and the processing delay parameter value and the processing delay parameter type may be a corresponding processing time value and a corresponding processing capability level value, respectively.

Optionally, when the first terminal 400 is scheduled a sidelink through a cellular link, the sidelink transmission configuration information may further include: a mode of scheduling a sidelink through a cellular link, where the mode of scheduling a sidelink through a cellular link may be indicated by using at least one of an RRC or SIB message, a DCI format, signaling in DCI, or an RNTI corresponding to the DCI; and the mode of scheduling a sidelink through a cellular link includes at least one of the following: indicating, through an LTE cellular link, the first terminal to send or receive data on an LTE sidelink; indicating, through an LTE cellular link, the first terminal to send or receive data on an NR sidelink; indicating, through an NR cellular link, the first terminal to send or receive data on an NR sidelink; or indicating, through an NR cellular link, the first terminal to send or receive data on an LTE sidelink.

Optionally, the processing capability of the first terminal 400 may be further determined based on a processing capability on the sidelink and a processing capability on the cellular link.

The processing capability on the cellular link may be a capability of the first terminal 400 for receiving and processing the sidelink transmission configuration information sent by the first network device. The processing capability on the sidelink may be a processing capability of the first terminal 400 for sending or receiving data on the sidelink based on the obtained sidelink transmission configuration information.

For example, the NR sidelink is scheduled through the NR cellular link. A scheduling process of the sidelink may be completed based on the processing capability of the terminal on the sidelink, or a scheduling process of the sidelink may be completed by considering both a processing capability of the terminal on the NR cellular link and the processing capability of the terminal on the sidelink, and a time and a resource position for transmission of the terminal on the sidelink are determined.

Optionally, if the sidelink transmission configuration information is DCI, the processing delay parameter for sending or receiving the data by the first terminal 400 in first mode on the NR sidelink based on the LTE DCI indication of the first network device, or the processing delay parameter for sending or receiving the data by the first terminal 400 in third mode on the LTE sidelink based on the NR DCI indication of the first network device, may include N1, M1, M1+M1a, N1+N2, M1+M2, or M1+M1a+N2. N1 is a required time from a time at which the first terminal 400 receives the last symbol occupied by the DCI to a time at which the first terminal 400 completes parsing of the DCI. N2 is a required time from the time at which the first terminal 400 completes parsing of the DCI to a time at which the first terminal 400 expects to start sidelink transmission. M1 is a required time from the time at which the first terminal 400 receives the last symbol occupied by the DCI to a time at which the first terminal 400 completes decoding of the DCI. M2 is a required time from the time at which the first terminal 400 completes decoding of the DCI to the time at which the first terminal 400 expects to start sidelink transmission. M1a is a required time from the time at which the first terminal 400 completes decoding of the DCI to the time at which the first terminal 400 completes parsing of the DCI.

Optionally, receiving, decoding, and parsing of the DCI may be completed by a Uu module. After completing parsing of the DCI, the Uu module may send a parsing result to a V2X module, and the V2X module performs a subsequent sidelink transmission process based on the processing capability of the first terminal 400. For example, the processing delay parameter may further include N. N is the required time from the time at which the first terminal 400 receives the last symbol occupied by the DCI to the time at which the first terminal 400 expects to start sidelink transmission.

Optionally, the processing delay parameter may further include a time Nx from a time at which the Uu module completes parsing of the DCI to a time at which the V2X module receives the parsing result, and a required time N3 from the time at which the NR V2X module receives the parsing result to a time at which the NR V2X module expects to start sidelink transmission. N2=Nx+N3. Nx is related to an implementation of a module of the first terminal. The implementation may be an interrupt-based mode, or may be a control and scheduling mode based on a shared protocol stack. If the implementation is the interrupt-based mode, after completing decoding of the DCI, LTE Uu module sends an interrupt signal to NR V2X module, and then NR V2X module reads corresponding decoding information from an internal memory.

Figure 9:
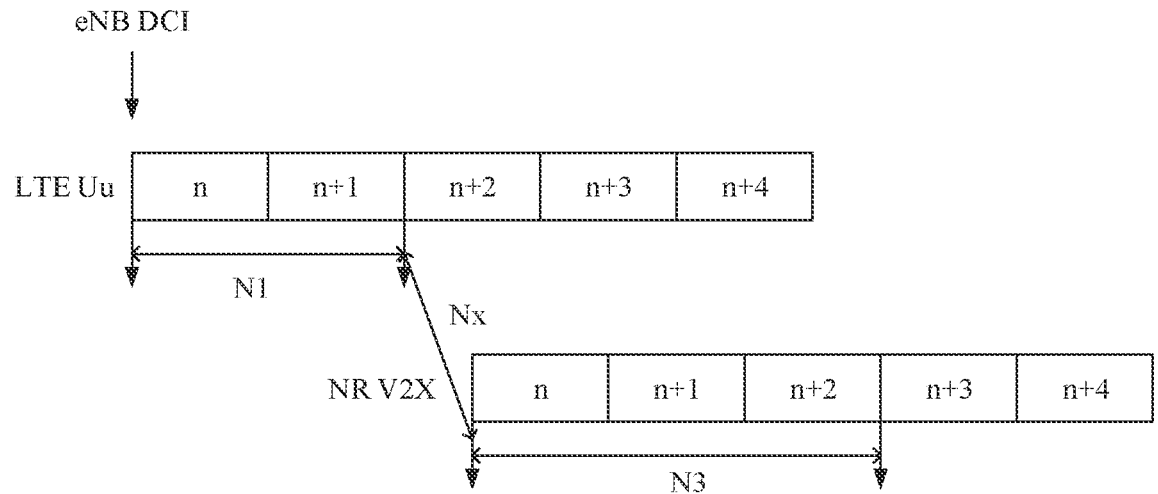
FIG. 9 is a first timing diagram of a data transmission processing process according to an embodiment of this application.

FIG. 9 is a first timing diagram of a data transmission processing process according to an embodiment of this application. The first terminal 400 accepts the LTE DCI indication of the first network device to send or receive the data in first mode on the NR sidelink. In an $n^{th}$ subframe in an LTE frame structure, the LTE Uu module receives signaling DCI for scheduling NR V2X transmission. N1 is a required time from a time at which the LTE Uu module of the first terminal 400 receives the last symbol occupied by the DCI to a time at which the LTE Uu module of the first terminal 400 completes parsing of the DCI. In an $(n+2)^{th}$ subframe, the LTE Uu module sends the parsing result to the NR V2X module. Nx is a time from the time at which the LTE Uu module completes parsing of the DCI to a time at which the NR V2X module receives the parsing result. In an $(n+3)^{th}$ subframe in an NR frame structure, sidelink transmission is expected to start. N3 is a required time from the time at which the NR V2X module receives the parsing result to a time at which the NR V2X module expects to start sidelink transmission.

Figure 10:
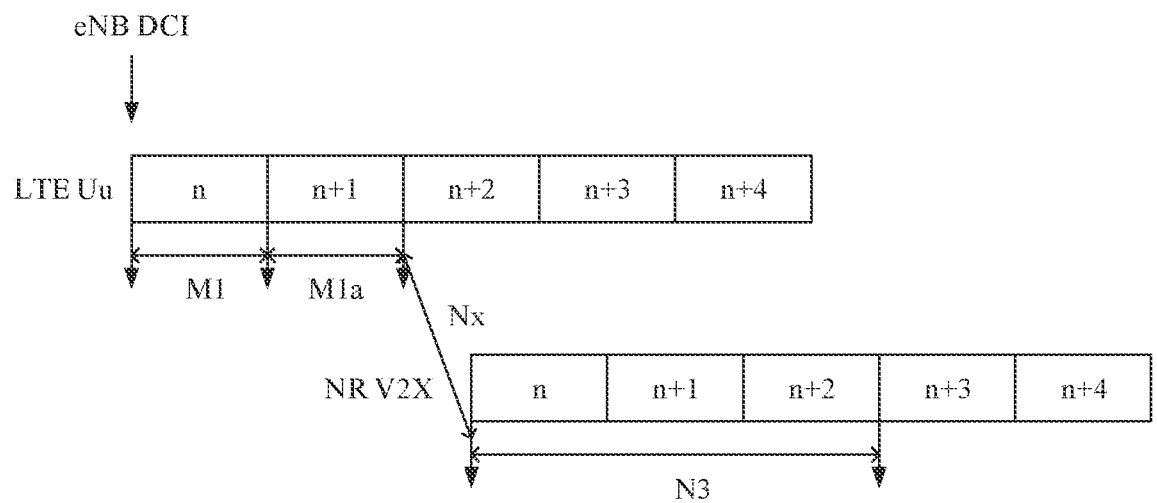
FIG. 10 is a second timing diagram of a data transmission processing process according to an embodiment of this application.

FIG. 10 is a second timing diagram of a data transmission processing process according to an embodiment of this application. The first terminal 400 accepts the LTE DCI indication of the first network device to send or receive the data in first mode on the NR sidelink. In an $n^{th}$ subframe in an LTE frame structure, the LTE Uu module receives signaling DCI for scheduling NR V2X transmission. M1 is a required time from a time at which the LTE Uu module of the first terminal 400 receives the last symbol occupied by the DCI to a time at which the LTE Uu module of the first terminal 400 completes decoding of the DCI. Mia is a required time from the time at which the LTE Uu module completes decoding of the DCI to a time at which the LTE Uu module completes parsing of the DCI. In an $(n+2)^{th}$ subframe, the LTE Uu module sends the parsing result to the NR V2X module. Nx is a time from a time at which the LTE Uu module completes parsing of the DCI to a time at which the NR V2X module receives the parsing result. In an $(n+3)^{th}$ subframe in an NR frame structure, sidelink transmission is expected to start. N3 is a required time from the time at which the NR V2X module receives the parsing result to a time at which the NR V2X module expects to start sidelink transmission.

It should be noted that the processing delay parameters may include a parameter used to represent a processing capability of the first terminal 400 for receiving DCI, a parameter used to represent a processing capability of the first terminal 400 for decoding or parsing the DCI, a parameter used to represent a processing capability of the first terminal 400 for performing sidelink transmission, and a parameter used to represent the foregoing total processing capabilities of the first terminal 400.

Optionally, if the sidelink transmission configuration information is an RRC message or a SIB message, the first terminal 400 receives the processing delay parameter for sending or receiving the data in second mode on the NR sidelink based on the LTE RRC or SIB indication of the first network device, or the first terminal 400 receives the processing delay parameter for sending or receiving the data by the first terminal 400 in fourth mode on the LTE sidelink based on the NR RRC or SIB indication of the first network device. The processing delay parameter includes L1, L2, L1a+L1b, L1+K1, L1a+L1b+K2, or L2+K2. L1 is a required time from a time at which the first terminal 400 receives the last symbol occupied by DCI for scheduling the RRC message or the SIB message to a time at which the first terminal 400 completes parsing of the RRC message or the SIB message. L1a is a required time from the time at which the first terminal 400 receives the last symbol occupied by the DCI for scheduling the RRC message or the SIB message to a time at which the first terminal 400 completes parsing of the DCI. L1b is a required time from the time at which the first terminal 400 completes parsing of the DCI to the time at which the first terminal 400 completes parsing of the RRC message or the SIB message. L2 is a required time from a time at which the first terminal 400 receives the last symbol occupied by a data channel on which the scheduling RRC message or SIB message is located to the time at which the first terminal 400 completes parsing of the RRC message or the SIB message. K1 is a required time from the time at which the first terminal 400 completes parsing of the DCI to a time at which the first terminal 400 expects to start sidelink transmission. K2 is a required time from the time at which the first terminal 400 completes parsing of the RRC message or the SIB message to the time at which the first terminal 400 expects to start sidelink transmission.

Optionally, receiving and parsing of the RRC or the SIB or the DCI for scheduling the RRC message or the SIB message may be completed by a Uu module. After completing parsing of the DCI, the Uu module may send a parsing result to a V2X module, and the V2X module performs a subsequent sidelink transmission process based on the processing capability of the first terminal 400.

It should be noted that the processing delay parameters may include a parameter used to represent a processing capability of the first terminal 400 for receiving or parsing the RRC or the SIB, a parameter used to represent a processing capability of the first terminal 400 for receiving or parsing the DCI for scheduling the RRC message or the SIB message, a parameter used to represent a processing capability of the first terminal 400 for performing sidelink transmission, and a parameter used to represent the foregoing total processing capabilities of the first terminal 400. For example, the processing delay parameter may further include L or K. L is a required time from the time at which the first terminal 400 receives the last symbol occupied by the DCI for scheduling the RRC message or the SIB message to the time at which the first terminal 400 expects to start sidelink transmission. K is a required time from the time at which the first terminal 400 receives the last symbol occupied by the data channel on which the scheduled RRC message or SIB message is located to the time at which the first terminal 400 expects to start sidelink transmission.

Optionally, the processing delay parameter may further include a time Lx from a time at which the Uu module completes parsing of the RRC message or the SIB message to a time at which the V2X module receives the parsing result, and a required time K3 from the time at which the V2X module receives the parsing result to a time at which the V2X module expects to start sidelink transmission. K2=Lx+K3, or K1=LX+K3. Similarly, Lx is related to an implementation of a module of the first terminal. The implementation may be an interrupt-based mode, or may be a control and scheduling mode based on a shared protocol stack. If the implementation is the interrupt-based mode, after completing decoding of the DCI, LTE Uu sends an interrupt signal to NR V2X, and then NR V2X reads corresponding decoding information from an internal memory.

Figure 11:
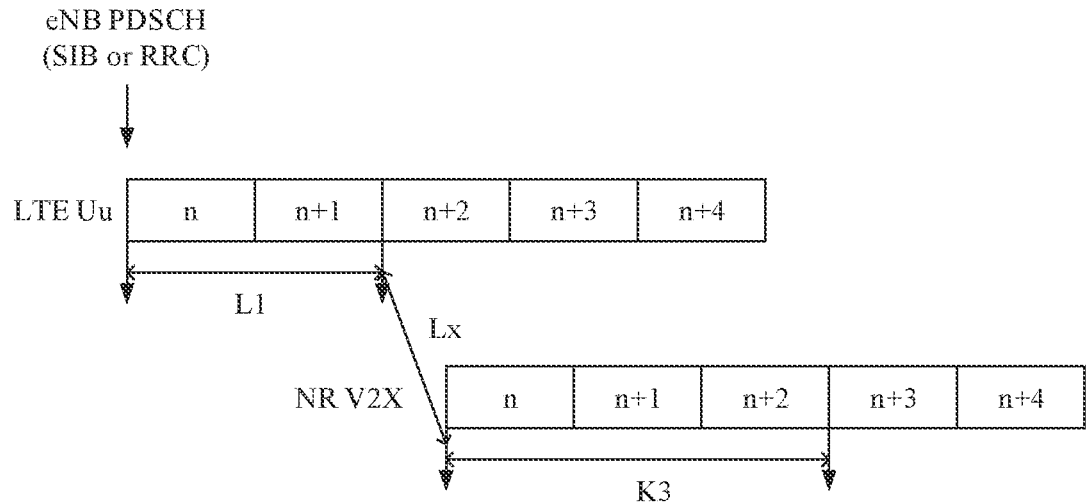
FIG. 11 is a third timing diagram of a data transmission processing process according to an embodiment of this application.

FIG. 11 is a third timing diagram of a data transmission processing process according to an embodiment of this application. The first terminal 400 accepts the LTE RRC or SIB indication of the first network device to send or receive the data in second mode on the NR sidelink. In an $n^{th}$ subframe in an LTE frame structure, the LTE Uu module receives signaling DCI for scheduling NR V2X transmission. L1 is a required time from a time at which the LTE Uu module of the first terminal 400 receives the last symbol occupied by the DCI for scheduling an RRC message or an SIB message to a time at which the LTE Uu module of the first terminal 400 completes parsing of the RRC message or the SIB message. In an $(n+2)^{th}$ subframe, the LTE Uu module sends the parsing result to the NR V2X module. Lx is a time from the time at which the LTE Uu module completes parsing of the RRC message or the SIB message to a time at which the NR V2X module receives the parsing result. In an $(n+3)^{th}$ subframe in an NR frame structure, sidelink transmission is expected to start. K3 is a required time from the time at which the NR V2X module receives the parsing result to a time at which the NR V2X module expects to start sidelink transmission.

Optionally, as shown in FIG. 8, the method may further include the following step:

803. The processor 701 of the first terminal 400 may execute a sending instruction in the memory 703, to report indication information of the processing capability of the first terminal 400 to the first network device.

It should be noted that the indication information of the processing capability that is reported by the first terminal 400 may be used to indicate whether the first terminal 400 supports sidelink transmission, and if the first terminal 400 supports sidelink transmission, a processing capability parameter in each of the foregoing processing steps may alternatively be a total capability parameter in the foregoing processing process.

Optionally, before receiving the sidelink transmission configuration information, the first terminal 400 may report the indication information related to the processing capability of the first terminal 400 to the first network device. The first network device determines, based on the processing capability of the first terminal 400, whether to perform sidelink scheduling and a scheduling mode for implementing the scheduling if the scheduling to be is performed, and determines, based on a specific scheduling mode and a time consumed by the first terminal 400 to process a scheduling process, an indication time for sending or receiving data on the sidelink.

Optionally, the processing capability of the first terminal 400 may be determined by using at least one of the following: a subcarrier spacing of the sidelink; a quantity of retransmissions on the sidelink; a quantity of slots occupied by one transmission on the sidelink; a transmission mode of the sidelink; a demodulation reference signal position of the sidelink; an operating frequency band of the sidelink; a type of an operating carrier of the sidelink; or a mapping mode of a sidelink transmission resource. The foregoing factors affect capabilities such as a processing time of the first terminal 400 in processing a process such as receiving, decoding, or parsing.

The transmission mode of the sidelink may be unicast, multicast, or broadcast. The type of the operating carrier on the sidelink may include a shared carrier or a dedicated carrier. Specifically, the shared carrier is a carrier including a cellular link and a sidelink, and the dedicated carrier is a carrier including only a cellular link.

Further, the sidelink transmission configuration information may further include: an indication time T for sending or receiving data on the sidelink by the first terminal 400. Before the first terminal 400 sends or receives the data on the sidelink based on the sidelink transmission configuration information and the processing capability of the first terminal 400, the method may further include: determining, based on the processing delay parameter and T, whether to perform data sending or receiving on the sidelink.

Optionally, if the sidelink transmission configuration information is DCI, that the first terminal 400 sends or receives the data on the sidelink based on the sidelink transmission configuration information and the processing capability of the first terminal 400 may include: If the time T that is indicated by the first network device and at which the first terminal 400 performs sidelink transmission is not earlier than a time point $T_{start}$ at which the first terminal 400 expects to start sidelink transmission, that is, the first terminal 400 can complete receiving, decoding, and parsing of the DCI, and a processing process such as sidelink transmission preparation before the indication time T, the first terminal 400 sends or receives the data on the sidelink. Alternatively, if the time T that is indicated by the first network device and at which the first terminal 400 performs sidelink transmission is earlier than a time point $T_{start}$ at which the first terminal 400 expects to start sidelink transmission, that is, the first terminal 400 cannot complete receiving, decoding, and parsing of the DCI, and a processing process such as sidelink transmission preparation before the indication time T, the first terminal 400 skips sending or receiving the data on the sidelink. $T_{start}$=N1+N2, M1+M2, or M1+M1a+N2.

Optionally, if the sidelink transmission configuration information is RRC or a SIB, that the first terminal 400 sends or receives the data on the sidelink based on the sidelink transmission configuration information and the processing capability of the first terminal 400 may include: If the time T that is indicated by the first network device and at which the first terminal 400 performs sidelink transmission is not earlier than a time point $T_{start}$ at which the first terminal 400 expects to start sidelink transmission, that is, the first terminal 400 can complete receiving and parsing of the RRC or the SIB, and a processing process such as sidelink transmission preparation before the indication time T, the first terminal 400 sends or receives the data on the sidelink. Alternatively, if the time T that is indicated by the first network device and at which the first terminal 400 performs sidelink transmission is earlier than a time point $T_{start}$ at which the first terminal 400 expects to start sidelink transmission, that is, the first terminal 400 cannot complete receiving and parsing of the RRC or the SIB, and a processing process such as sidelink transmission preparation before the indication time T, the first terminal 400 skips sending or receiving the data on the sidelink. $T_{start}$=L1+K1, L1a+L1b+K2, or L2+K2.

Optionally, if the sidelink transmission configuration information is RRC or a SIB, that the first terminal 400 sends or receives the data on the sidelink based on the sidelink transmission configuration information and the processing capability of the first terminal 400 may include: The first terminal 400 determines a sidelink transmission resource based on the sidelink transmission configuration information; and sends or receives the data on the sidelink by using the sidelink transmission resource.

Further, the sidelink transmission configuration information may further include time domain resource configuration information and frequency domain resource configuration information; the time domain resource configuration information is used to indicate a time domain resource used for sending or receiving on the sidelink; and the frequency domain resource configuration information is used to indicate a frequency domain resource used for sending or receiving on the sidelink. The sending or receiving the data on the sidelink may include: The first terminal sends or receives the data on the sidelink based on the time domain resource configuration information and the frequency domain resource configuration information.

Optionally, if the sidelink transmission configuration information is RRC or a SIB, the sidelink transmission configuration information may further include frequency information, a system bandwidth, and a TDD subframe configuration mode, and the first terminal 400 needs to first determine the time domain resource configuration information based on the TDD subframe configuration mode, and determine the frequency domain resource configuration information based on the frequency information and the system bandwidth; and then sends or receives the data on the sidelink based on the determined time domain resource configuration information and frequency domain resource configuration information.

Further, the sidelink transmission configuration information may further include semi-persistent scheduling SPS configuration index information and SPS indication information; the SPS configuration index information may include configured SPS information; and the SPS indication information may include SPS information required for sending or receiving on the sidelink. Before the first terminal sends or receives the data on the sidelink, the method may further include: The first terminal completes SPS activation and deactivation based on the SPS configuration index information and the SPS indication information.

It should be noted that, after completing processing of the RRC/SIB/DCI, the first terminal 400 determines, based on the semi-persistent scheduling SPS configuration index information and the SPS indication information that are obtained through parsing, configured SPS information and SPS information required for sending or receiving on the sidelink, and completes SPS activation required for sending or receiving on the sidelink and deactivation of other SPS, so that the first terminal 400 sends or receives data on the sidelink by using activated SPS.

It should be noted that, when deactivation signaling is sent during current SPS transmission, the signaling takes effect at next SPS transmission moment.

Further, the processing delay parameter may further include a time K3-1 from the time at which the V2X module receives the parsing result from the Uu module to a time at which the V2X module completes SPS activation, and a time K3-2 from the time at which the V2X module receives the parsing result from the Uu module to a time at which the V2X module completes SPS deactivation.

Figure 12:
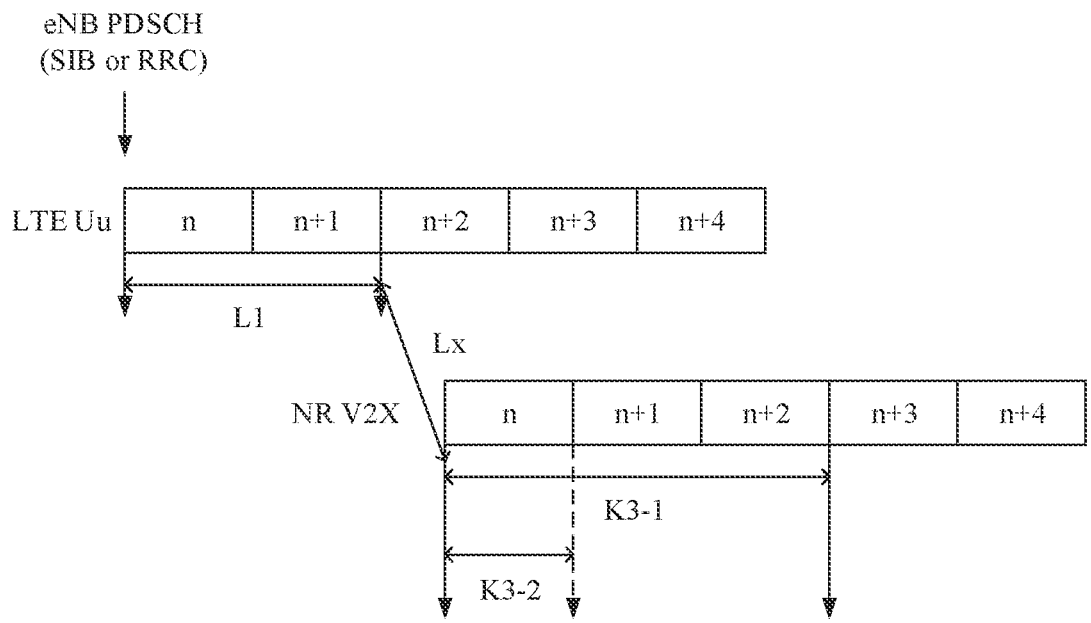
FIG. 12 is a fourth timing diagram of a data transmission processing process according to an embodiment of this application.

FIG. 12 is a fourth timing diagram of a data transmission processing process according to an embodiment of this application. The first terminal 400 accepts the LTE RRC or SIB indication of the first network device to send or receive the data in second mode on the NR sidelink. In an $n^{th}$ subframe in an LTE frame structure, the LTE Uu module receives signaling DCI for scheduling NR V2X transmission. L1 is a required time from a time at which the LTE Uu module of the first terminal 400 receives the last symbol occupied by the DCI for scheduling an RRC message or a SIB message to a time at which the LTE Uu module of the first terminal 400 completes parsing of the RRC message or the SIB message. In an $(n+2)^{th}$ subframe, the LTE Uu module sends the parsing result to the NR V2X module. Lx is a time from the time at which the LTE Uu module completes parsing of the RRC message or the SIB message to a time at which the NR V2X module receives the parsing result. K3-1 is a time from the time at which the NR V2X module receives the parsing result to a time at which the NR V2X module completes SPS activation. H2 is a time K3-2 from the time at which the NR V2X module receives the parsing result to a time at which the NR V2X module completes SPS deactivation.

Figure 13:
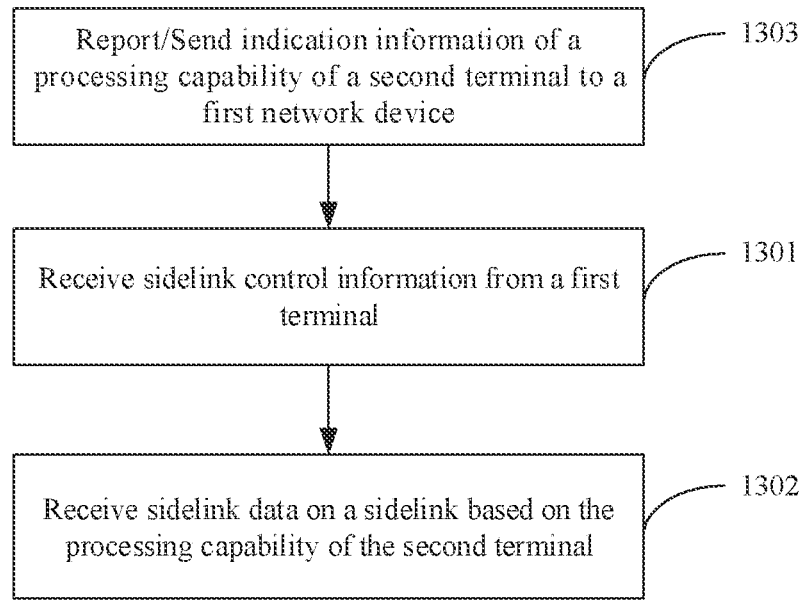
FIG. 13 is a flowchart of another data transmission method according to an embodiment of this application.

FIG. 13 is a flowchart of a data transmission method according to an embodiment of this application. The method is applied to a second terminal 1300. The second terminal 1300 has a same component configuration as a first terminal 400, that is, includes components such as a processor, a radio frequency (RF) circuit, a memory, a touchscreen, a Bluetooth apparatus, one or more sensors, a Wi-Fi apparatus, a positioning apparatus, an audio circuit, a peripheral interface, a power supply system, a camera (a front-facing camera and/or a rear-facing camera), a flash, a micro projection apparatus, and a near field communications (NFC) apparatus. The memory may also store instructions used to implement three modular functions: a receiving instruction, a transmission instruction, and a sending instruction, and the processor executes computer-executable instructions stored in the memory, to implement a data transmission method provided in the following embodiments of this application.

As shown in FIG. 13, the method may include the following steps 1301 and 1302.

1301. The processor of the second terminal 1300 executes the transmission instruction in the memory, to receive sidelink control information from the first terminal through a sidelink, where the sidelink control information is used to indicate the second terminal to receive sidelink data.

1302. The processor of the second terminal 1300 executes the transmission instruction in the memory, to receive the sidelink data on the sidelink based on a processing capability of the second terminal.

Optionally, the processing capability may include: processing time type indication information or a processing time $K_t$ from a time at which the second terminal 1300 receives the last symbol of sidelink control information associated with the sidelink data sent by the first terminal to a time at which the second terminal 1300 completes demodulation of the sidelink data; and the processing time type indication information is used to indicate the processing time $K_t$ corresponding to the processing capability of the second terminal.

When receiving the data on the sidelink, the second terminal 1300 determines, by considering a capability of the second terminal 1300, whether to receive the sidelink data sent by the first terminal 400. For example, because the second terminal 1300 does not support an NR sidelink, the second terminal 1300 refuses to receive NR sidelink data sent by the first terminal 400. For another example, the second terminal 1300 cannot complete receiving of the sidelink data within a time specified by the first terminal 400 or cannot provide a feedback within a time specified by the first terminal 400; in this case, the second terminal 1300 abandons receiving of the sidelink data sent by the first terminal 400.

Further, the method may further include the following step:

1303. The processor of the second terminal 1300 executes the sending instruction in the memory, to report/send indication information of the processing capability of the second terminal to a first network device.

Optionally, the second terminal 1300 may report the indication information related to the processing capability of the second terminal 1300 to the first network device before receiving the sidelink control information, so that the first network device determines, based on the processing capability of the second terminal 1300, whether to indicate the first terminal 400 to send the sidelink data to the second terminal 1300. Alternatively, the second terminal 1300 may send the indication information related to the processing capability of the second terminal 1300 to the first terminal 400 before receiving the sidelink control information, so that the first terminal 400 determines, based on the processing capability of the second terminal 1300, whether to send the sidelink data to the second terminal 1300, or determines an indication time required by the second terminal 1300 for completing receiving and parsing of the sidelink data or providing a corresponding feedback.

Optionally, the processing capability of the second terminal 1300 may be determined by using at least one of the following: a subcarrier spacing of the sidelink; a quantity of retransmissions on the sidelink; a quantity of slots occupied by one transmission on the sidelink; a transmission mode of the sidelink; a demodulation reference signal position of the sidelink; an operating frequency band of the sidelink; a type of an operating carrier of the sidelink; or a mapping mode of a sidelink transmission resource. The foregoing factors affect capabilities such as a processing time of the second terminal 1300 in processing a process such as receiving, decoding, or parsing.

The transmission mode of the sidelink may be unicast, multicast, or broadcast. The type of the operating carrier on the sidelink may include a shared carrier or a dedicated carrier. Specifically, the shared carrier is a carrier including a cellular link and a sidelink, and the dedicated carrier is a carrier including only a cellular link.

Optionally, the sidelink control information includes a delay requirement K corresponding to the sidelink data. That the second terminal 1300 receives the sidelink data on the sidelink based on the processing capability of the second terminal 1300 may include: The second terminal 1300 determines, based on the delay requirement K corresponding to the sidelink data and the processing capability of the second terminal, whether to receive the sidelink data or whether to send feedback information for the sidelink data.

Optionally, the determining whether to demodulate the sidelink data or whether to send feedback information for the sidelink data may include: If the processing time $K_t$ of the second terminal 1300 is not greater than the delay requirement K corresponding to the sidelink data, the second terminal 1300 determines to receive the sidelink data or to send the feedback information for the sidelink data; or if the processing time $K_t$ of the second terminal 1300 is greater than the delay requirement K corresponding to the sidelink data, the second terminal 1300 determines not to receive the sidelink data, or not to send the feedback information for the sidelink data, or to send NACK feedback information for the sidelink data.

In the embodiments of this application, function modules of the server may be obtained through division. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division during actual implementation.

Figure 14:
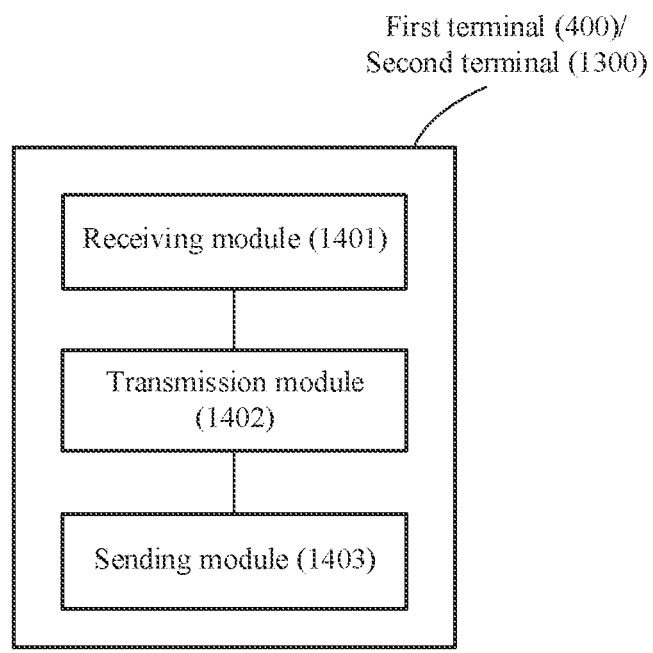
FIG. 14 is a schematic diagram of a virtual structure of a terminal according to an embodiment of this application.

For example, when the function modules are obtained through division in an integrated mode, FIG. 14 is a schematic diagram of a virtual structure of a terminal according to an embodiment of this application. The terminal may be a first terminal 400 or a second terminal 1300, and the first terminal 400 may include a receiving module 1401 and a transmission module 1402. The receiving module 1401 is configured to receive sidelink transmission configuration information from a first network device through a cellular link, where the sidelink transmission configuration information is used to indicate that an NR sidelink is scheduled through an LTE cellular link, or an LTE sidelink is scheduled through an NR cellular link, or an NR sidelink is scheduled through an NR cellular link. The transmission module 1402 is configured to send or receive data on a sidelink based on the sidelink transmission configuration information and a processing capability of the first terminal.

Optionally, the sidelink transmission configuration information may be any one of the following information: downlink control information DCI, a radio resource control RRC message, or a system information block SIB message.

Optionally, the first terminal 400 may further include a sending module 1403, configured to report indication information of the processing capability of the first terminal to the first network device.

Optionally, the processing capability of the first terminal may include at least one of the following: the first terminal 400 supports the first network device in indicating, through the LTE cellular link, the first terminal 400 to perform data transmission on the NR sidelink; the first terminal 400 supports the first network device in indicating, through the NR cellular link, the first terminal 400 to perform data transmission on the LTE sidelink; or the first terminal 400 supports the first network device in indicating, through the NR cellular link, the first terminal 400 to perform data transmission on the NR sidelink.

Optionally, the processing capability of the first terminal 400 may include at least one of the following: a processing delay parameter for sending or receiving data by the first terminal 400 in first mode on the NR sidelink based on a DCI indication that is received from the first network device through the LTE cellular link; a processing delay parameter for sending or receiving data in second mode on the NR sidelink based on an RRC or SIB indication that is received from the first network device through the LTE cellular link; a processing delay parameter for sending or receiving data in third mode on the LTE sidelink based on a DCI indication that is received from the first network device through the NR cellular link; a processing delay parameter for sending or receiving data in fourth mode on the LTE sidelink based on an RRC or SIB indication that is received from the first network device through the NR cellular link; a processing delay parameter for sending or receiving data in first mode on the NR sidelink based on a DCI indication that is received from the first network device through the NR cellular link; or a processing delay parameter for sending or receiving data in second mode on the NR sidelink based on an RRC or SIB indication that is received from the first network device through the NR cellular link.

Optionally, any one of the processing delay parameters may include processing delay parameter value indication information or processing delay parameter type indication information; and the processing delay parameter type indication information is used to indicate a processing delay parameter type or a processing delay parameter value corresponding to the processing capability of the first terminal.

Optionally, the processing capability of the first terminal may be determined by using at least one of the following: a subcarrier spacing of the sidelink; a quantity of retransmissions on the sidelink; a quantity of slots occupied by one transmission on the sidelink; a transmission mode of the sidelink; a demodulation reference signal position of the sidelink; an operating frequency band of the sidelink; a type of an operating carrier of the sidelink; or a mapping mode of a sidelink transmission resource.

Optionally, the sidelink transmission configuration information may further include but is not limited to: a mode of scheduling a sidelink through a cellular link, where the mode of scheduling a sidelink through a cellular link may be indicated by using at least one of an RRC or SIB message, a DCI format, signaling in DCI, or an RNTI corresponding to the DCI; and the mode of scheduling a sidelink through a cellular link includes at least one of the following: indicating, through an LTE cellular link, the first terminal to send or receive data on an LTE sidelink; indicating, through an LTE cellular link, the first terminal to send or receive data on an NR sidelink; indicating, through an NR cellular link, the first terminal to send or receive data on an NR sidelink; or indicating, through an NR cellular link, the first terminal to send or receive data on an LTE sidelink.

Optionally, the sidelink transmission configuration information may further include: an indication time T for sending or receiving data on the sidelink by the first terminal 400. Before the first terminal 400 sends or receives the data on the sidelink based on the sidelink transmission configuration information and the processing capability of the first terminal, the method further includes: determining, based on the processing delay parameter and T, whether to perform data sending or receiving on the sidelink.

Optionally, if the sidelink transmission configuration information is DCI, that the first terminal 400 sends or receives the data on the sidelink based on the sidelink transmission configuration information and the processing capability of the first terminal includes: If the time T that is indicated by the first network device and at which the first terminal 400 performs sidelink transmission is not earlier than a time point $T_{start}$ at which the first terminal 400 expects to start sidelink transmission, the first terminal 400 sends or receives the data on the sidelink. Alternatively, if the time T that is indicated by the first network device and at which the first terminal 400 performs sidelink transmission is earlier than a time point $T_{start}$ at which the first terminal 400 expects to start sidelink transmission, the first terminal 400 skips sending or receiving the data on the sidelink. $T_{start}$=N1+N2, M1+M2, or M1+M1a+N2.

Optionally, if the sidelink transmission configuration information is RRC or a SIB, that the first terminal 400 sends or receives the data on the sidelink based on the sidelink transmission configuration information and the processing capability of the first terminal includes: If the time T that is indicated by the first network device and at which the first terminal 400 performs sidelink transmission is not earlier than a time point $T_{start}$ at which the first terminal 400 expects to start sidelink transmission, the first terminal 400 sends or receives the data on the sidelink. Alternatively, if the time T that is indicated by the first network device and at which the first terminal 400 performs sidelink transmission is earlier than a time point $T_{start}$ at which the first terminal 400 expects to start sidelink transmission, the first terminal 400 skips sending or receiving the data on the sidelink. $T_{start}$=L1+K1, L1a+L1b+K2, or L2+K2.

Optionally, if the sidelink transmission configuration information is RRC or a SIB, that the first terminal 400 sends or receives the data on the sidelink based on the sidelink transmission configuration information and the processing capability of the first terminal includes: The first terminal 400 determines a sidelink transmission resource based on the sidelink transmission configuration information; and sends or receives the data on the sidelink by using the sidelink transmission resource.

Optionally, the sidelink transmission configuration information may further include time domain resource configuration information and frequency domain resource configuration information; the time domain resource configuration information is used to indicate a time domain resource used for sending or receiving on the sidelink; and the frequency domain resource configuration information is used to indicate a frequency domain resource used for sending or receiving on the sidelink. The sending or receiving data on a sidelink includes: The first terminal 400 sends or receives the data on the sidelink based on the time domain resource configuration information and the frequency domain resource configuration information.

Optionally, the sidelink transmission configuration information may further include semi-persistent scheduling SPS configuration index information and SPS indication information; the SPS configuration index information may include configured SPS information; and the SPS indication information may include SPS information required for sending or receiving on the sidelink. Before the first terminal 400 sends or receives the data on the sidelink, the method may further include: The first terminal 400 completes SPS activation and deactivation based on the SPS configuration index information and the SPS indication information.

Similarly, the second terminal 1300 may include a transmission module 1402. The transmission module 1402 is configured to receive sidelink control information from the first terminal through a sidelink, where the sidelink control information is used to indicate the second terminal to receive sidelink data. The transmission module 1402 is farther configured to receive the sidelink data on the sidelink based on a processing capability of the second terminal.

Optionally, the second terminal 1300 may further include a sending module 1403, configured to report indication information of the processing capability of the second terminal to a first network device; or the second terminal 1300 sends indication information of the processing capability of the second terminal to the first terminal.

Optionally, the processing capability of the second terminal is determined by using at least one of the following: a subcarrier spacing of the sidelink; a quantity of retransmissions on the sidelink; a quantity of slots occupied by one transmission on the sidelink; a transmission mode of the sidelink; a demodulation reference signal position of the sidelink; an operating frequency band of the sidelink; a type of an operating carrier of the sidelink; or a mapping mode of a sidelink transmission resource.

Optionally, the processing capability may include: processing time type indication information or a processing time $K_t$ from a time at which the second terminal 1300 receives the last symbol of sidelink control information associated with the sidelink data sent by the first terminal to a time at which the second terminal 1300 completes demodulation of the sidelink data; and the processing time type indication information is used to indicate the processing time $K_t$ corresponding to the processing capability of the second terminal.

Optionally, the sidelink control information includes a delay requirement K corresponding to the sidelink data. That the second terminal 1300 receives the sidelink data on the sidelink based on the processing capability of the second terminal may include: The second terminal determines, based on the delay requirement K corresponding to the sidelink data and the processing capability of the second terminal, whether to receive the sidelink data or whether to send feedback information for the sidelink data.

Optionally, the determining whether to demodulate the sidelink data or whether to send feedback information for the sidelink data may include: If the processing time $K_t$ of the second terminal 1300 is not greater than the delay requirement K corresponding to the sidelink data, the second terminal 1300 determines to receive the sidelink data or to send the feedback information for the sidelink data; or if the processing time $K_t$ of the second terminal 1300 is greater than the delay requirement K corresponding to the sidelink data, the second terminal 1300 determines not to receive the sidelink data, or not to send the feedback information for the sidelink data, or to send NACK feedback information for the sidelink data.

It should be noted that the second terminal 1300 may further include a receiving module 1401, and roles of the first terminal 400 and the second terminal 1300 are interchangeable. To be specific, the receiving module 1401 of the second terminal 1300 may receive, from the first network device, sidelink transmission configuration information used to indicate that an NR sidelink is scheduled through an LTE cellular link; an LTE sidelink is scheduled through an NR cellular link; or an NR sidelink is scheduled through an NR cellular link, and the transmission module 1402 sends sidelink data to the first terminal 400 on a sidelink based on the sidelink transmission configuration information and a processing capability of the second terminal 1300.

The foregoing descriptions about implementations allow a person skilled in the art to clearly understand that, for the purpose of convenient and brief description, division into only the foregoing function modules is used as an example for description. During actual application, the foregoing functions can be allocated to different function modules for implementation based on a requirement. In other words, an inner structure of an apparatus is divided into different function modules to implement all or some of the functions described above.

In the several embodiments provided in this application, it should be understood that the disclosed apparatus and method may be implemented in other modes. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may be or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
reporting, by an apparatus, indication information of a processing capability of the apparatus, wherein the processing capability of the apparatus comprises a capability of the apparatus of supporting a first network device in indicating, by using New Radio (NR) downlink control information (DCI), to the apparatus to perform data transmission in a third mode on a long term evolution (LTE) sidelink, wherein the processing capability of the apparatus further comprises a processing delay parameter, wherein the processing delay parameter is a processing delay parameter for sending or receiving data in a third mode on an NR DCI scheduling the LTE sidelink, and the first network device is a gNB;
receiving, by the apparatus, DCI from a first network device through an NR cellular link, wherein the DCI indicates that the LTE sidelink is scheduled through the NR cellular link; and
sending or receiving, by the apparatus, data on the LTE sidelink based on the DCI.

2. The method according to claim 1, wherein:
a mode of scheduling the LTE sidelink through the NR cellular link is indicated by using at least one of a format of the DCI or a radio network temporary identifier (RNTI) corresponding to the DCI.

3. The method according to claim 1, wherein the DCI comprises an indication of a time for sending or receiving data on the LTE sidelink.

4. A method, comprising:
receiving, by a first network device, indication information of a processing capability of an apparatus, wherein the processing capability of the apparatus comprises a capability of the apparatus of supporting a first network device in indicating, by using New Radio (NR) downlink control information (DCI), to the apparatus to perform data transmission in a third mode on a long term evolution (LTE) sidelink, wherein the processing capability of the apparatus further comprises a processing delay parameter, wherein the processing delay parameter is a processing delay parameter for sending or receiving data by the apparatus in a third mode on an NR DCI scheduling the LTE sidelink, and the first network device is a gNB;
determining, by the first network device, DCI, wherein the DCI indicates that the LTE sidelink is scheduled through an NR cellular link; and
sending, by the first network device, the DCI to the apparatus through the LTE cellular link.

5. The method according to claim 4, wherein:
a mode of scheduling the LTE sidelink through the NR cellular link is indicated by using at least one of a format of the DCI or a Radio Network Temporary Identifier (RNTI) corresponding to the DCI.

6. The method according to claim 4, wherein the DCI comprises an indication of a time for sending or receiving data on the LTE sidelink.

7. An apparatus, comprising:
a memory storage comprising instructions; and
one or more processors in communication with the memory storage, wherein execution of the instructions by the one or more processors causes the apparatus to:
report an indication information of a processing capability of the apparatus, wherein the processing capability of the apparatus comprises a capability of the apparatus of supporting a first network device in indicating, by using a New Radio (NR) downlink control information (DCI), to the apparatus to perform data transmission in a third mode on a long term evolution (LTE) sidelink, wherein the processing capability of the apparatus further comprises a processing delay parameter, wherein the processing delay parameter is a processing delay parameter for sending or receiving data in a third mode on an NR DCI scheduling the LTE sidelink, and the first network device is a gNB;

receive DCI from the first network device through an NR cellular link wherein the DCI indicates that the LTE sidelink is scheduled through the NR cellular link; and send or receive data on the LTE sidelink based on the DCI.

8. The apparatus according to claim 7, wherein:
a mode of scheduling the LTE sidelink through the NR cellular link is indicated by using at least one of a format of the DCI, or a Radio Network Temporary Identifier (RNTI) corresponding to the DCI.

9. The apparatus according to claim 7, wherein the DCI comprises an indication of a time for sending or receiving data on the sidelink.

10. The apparatus according to claim 7, wherein the apparatus is a road side unit, or a vehicle-mounted terminal.

11. A first network device, comprising:
a memory storage comprising instructions; and
one or more processors in communication with the memory storage, wherein execution of the instructions by the one or more processors causes the first network device to:

receive an indication information of a processing capability of an apparatus, wherein the processing capability of the apparatus comprises a capability of the apparatus of supporting a first network device in indicating, by using a New Radio (NR) downlink control information (DCI), to the apparatus to perform data transmission in a third mode on a long term evolution (LTE) sidelink, wherein the processing capability of the apparatus further comprises a processing delay parameter, wherein the processing delay parameter is a processing delay parameter for sending or receiving data by the apparatus in a third mode on an NR DCI scheduling the LTE sidelink, and the first network device is a gNB;

determine DCI, wherein the DCI indicates the LTE sidelink is scheduled through an NR cellular link; and send the DCI to the apparatus through the LTE cellular link.

12. The first network device according to claim 11, wherein:
a mode of scheduling the LTE sidelink through the NR cellular link is indicated by using at least one of a format of the DCI, or a Radio network Temporary Identifier (RNTI) corresponding to the DCI.

13. The first network device according to claim 11, wherein the DCI comprises an indication of a time for sending or receiving data on the sidelink.

* * * * *

UNITED STATES PATENT AND TRADEMARK OFFICE
CERTIFICATE OF CORRECTION

| | | |
|---|---|---|
| PATENT NO. | : 12,446,044 B2 | Page 1 of 1 |
| APPLICATION NO. | : 17/371835 | |
| DATED | : October 14, 2025 | |
| INVENTOR(S) | : Chao Li | |

It is certified that error appears in the above-identified patent and that said Letters Patent is hereby corrected as shown below:

In the Specification

In Column 4, Line 38, delete "si delink" and insert -- sidelink --.

In Column 8, Line 26, delete "no" and insert -- 110 --.

In Column 8, Line 34, delete "no" and insert -- 110 --.

In Column 19, Line 27, delete "RNTT" and insert -- RNTI --.

In Column 20, Line 12, delete "Mia" and insert -- M1a --.

In Column 21, Line 5, delete "Mia" and insert -- M1a --.

In Column 22, Line 28, delete "K1=LX+K3." and insert -- K1=Lx+K3. --.

In Column 30, Line 6, delete "farther" and insert -- further --.

Signed and Sealed this
Ninth Day of December, 2025

John A. Squires
*Director of the United States Patent and Trademark Office*